(12) United States Patent
Langhammer

(10) Patent No.: US 7,287,051 B1
(45) Date of Patent: Oct. 23, 2007

(54) MULTI-FUNCTIONAL DIGITAL SIGNAL PROCESSING CIRCUITRY

(75) Inventor: Martin Langhammer, Alderbury (GB)

(73) Assignee: Altera Corporation, San Jose, CA (US)

( * ) Notice: Subject to any disclaimer, the term of this patent is extended or adjusted under 35 U.S.C. 154(b) by 703 days.

(21) Appl. No.: 10/678,201

(22) Filed: Oct. 3, 2003

(51) Int. Cl.
*G06F 7/48* (2006.01)

(52) U.S. Cl. ..................................... 708/490

(58) Field of Classification Search ............... 708/490
See application file for complete search history.

(56) References Cited

U.S. PATENT DOCUMENTS

| | | | | |
|---|---|---|---|---|
| 3,926,367 A | * | 12/1975 | Bond et al. ............... | 708/821 |
| 4,344,151 A | * | 8/1982 | White ....................... | 708/622 |
| 5,204,829 A | * | 4/1993 | Lyu et al. .................. | 708/508 |
| 5,694,349 A | * | 12/1997 | Pal ............................. | 708/622 |
| 6,122,654 A | * | 9/2000 | Zhou et al. ................ | 708/622 |
| 6,400,290 B1 | | 6/2002 | Langhammer et al. | |
| 6,530,010 B1 | * | 3/2003 | Hung et al. ............... | 712/1 |
| 6,538,470 B1 | | 3/2003 | Langhammer et al. | |
| 6,566,906 B1 | | 5/2003 | Hwang et al. | |
| 6,628,140 B2 | | 9/2003 | Langhammer et al. | |
| 6,826,587 B1 | * | 11/2004 | Montalvo et al. ........ | 708/622 |
| 6,847,378 B2 | * | 1/2005 | Oberoi et al. ............ | 345/600 |
| RE39,385 E | * | 11/2006 | Brightman et al. ...... | 708/490 |
| 2002/0089348 A1 | | 7/2002 | Langhammer | |

OTHER PUBLICATIONS

U.S. Appl. No. 09/826,527, filed Apr. 4, 2001, Langhammer.
U.S. Appl. No. 10/132,873, filed Apr. 24, 2002, Langhammer.
U.S. Appl. No. 10/294,234, filed Nov. 13, 2002, Farrugia et al.
U.S. Appl. No. 10/349,541, filed Jan. 21, 2003, Venkata et al.
U.S. Appl. No. 10/383,304, filed Mar. 5, 2003, Burney et al.
*Numerical Recipes in C: The Art of Scientific Computing*, Cambridge University Press, 1992, pp. 176-178.

* cited by examiner

*Primary Examiner*—D. H. Malzahn
(74) *Attorney, Agent, or Firm*—Fish & Neave IP Group of Ropes & Gray LLP; Robert R. Jackson

(57) ABSTRACT

Multi-functional digital signal processing ("DSP") circuitry can perform any of a wide range of different DSP functions. For example, the DSP circuitry can perform multiplication of simple or complex numbers of different lengths. The multiplication of simple (i.e., non-complex) numbers can be augmented with addition of the resulting products. The DSP circuitry can also support implementing finite impulse response filters of either even or odd order.

35 Claims, 14 Drawing Sheets

US 7,287,051 B1

MULTI-FUNCTIONAL DIGITAL SIGNAL PROCESSING CIRCUITRY

BACKGROUND OF THE INVENTION

This invention relates to digital signal processing ("DSP") circuitry, and more particularly to DSP circuitry that is capable of performing a wide range of DSP functions.

Programmable logic devices ("PLDs") are well known for their ability to perform any of a wide range of functions, depending on how they are programmed. Programming may be done by storing data in control bits on the PLD, by custom-configuring one or more layers of the materials used to fabricate the PLD, or by any other suitable means. Depending on the technology employed, the programming may be volatile or non-volatile, one-time-only or reprogrammable, etc.

In addition to the general-purpose circuitry typically included in the architecture of a PLD, it is also known to include various types of special-purpose circuitry in such devices. Examples of such special-purpose circuitry are blocks of memory, microprocessor circuitry, DSP circuitry, etc. Because PLDs are typically designed to satisfy any of a wide range of needs, it may also be desirable for any special-purpose circuitry that is included to also have some flexibility with regard to the functions it can perform. DSP circuitry with multi-functional capability is known (e.g., for inclusion on PLDs). But improvements are always being sought in terms, for example, of being able to support more DSP functions with less DSP circuitry.

SUMMARY OF THE INVENTION

In accordance with the present invention, a block of DSP circuitry advantageously includes several (preferably only three) multiplier circuits, each of which can perform either one relatively long multiplication (e.g., one 18×18 multiplication) or plural, separate, relatively short multiplications (e.g., two 9×9 multiplications). Input adder circuitry is preferably included for selectively adding inputs to produce sums for use by the multipliers, but certain inputs to the adders can also preferably be nulled if desired and/or certain inputs can bypass the adders if desired. (As used herein, terms like "adder" will be understood to also include subtraction. In other words, references to addition are generic to addition and subtraction, unless the context is inconsistent with that interpretation. This applies to any addition used anywhere throughout the circuitry.) Output adder circuitry is also preferably provided for selectively combining outputs of the multipliers. Various adders are preferably operable to perform either one relatively long addition (e.g., one 18-plus-18 addition) or plural, separate, relatively short additions (e.g., two 9-plus-9 additions).

The DSP circuitry also preferably includes registers for optionally storing data on which the other DSP circuitry can operate. (These registers are preferably bypassable in situations that do not require their use.) Connections are preferably provided between the registers to allow successive data samples to be successively shifted through chains of the registers. The registers are preferably chained together and also connected to the other DSP circuitry to allow the circuitry to be used to perform a variety of different digital filtering operations (e.g., to operate as finite impulse response filters of even or odd order).

Other operations that the DSP circuitry can perform include (1) simple multiplications of various lengths, (2) simple multiplications with summations, both of various lengths, and (3) complex multiplications of various lengths.

The DSP circuitry may be part of the circuitry of a programmable logic device ("PLD"). The other circuitry of the PLD may include programmable logic circuitry and general routing circuitry. The general routing circuitry may be used to provide signals to and/or to receive signals from the DSP circuitry and the programmable logic circuitry. The general routing circuitry may also provide connections between various parts of the programmable logic circuitry, as well as connections between the programmable logic circuitry and the DSP circuitry.

Further features of the invention, its nature and various advantages, will be more apparent from the accompanying drawings and the following detailed description.

BRIEF DESCRIPTION OF THE DRAWINGS

FIG. 3 is a simplified schematic block diagram of a portion of an illustrative embodiment of circuitry in accordance with the invention.

FIG. 4 is a continuation of the FIG. 3 circuitry.

FIG. 5 is a further continuation of the FIGS. 3 and 4 circuitry.

DETAILED DESCRIPTION

Figure 1:
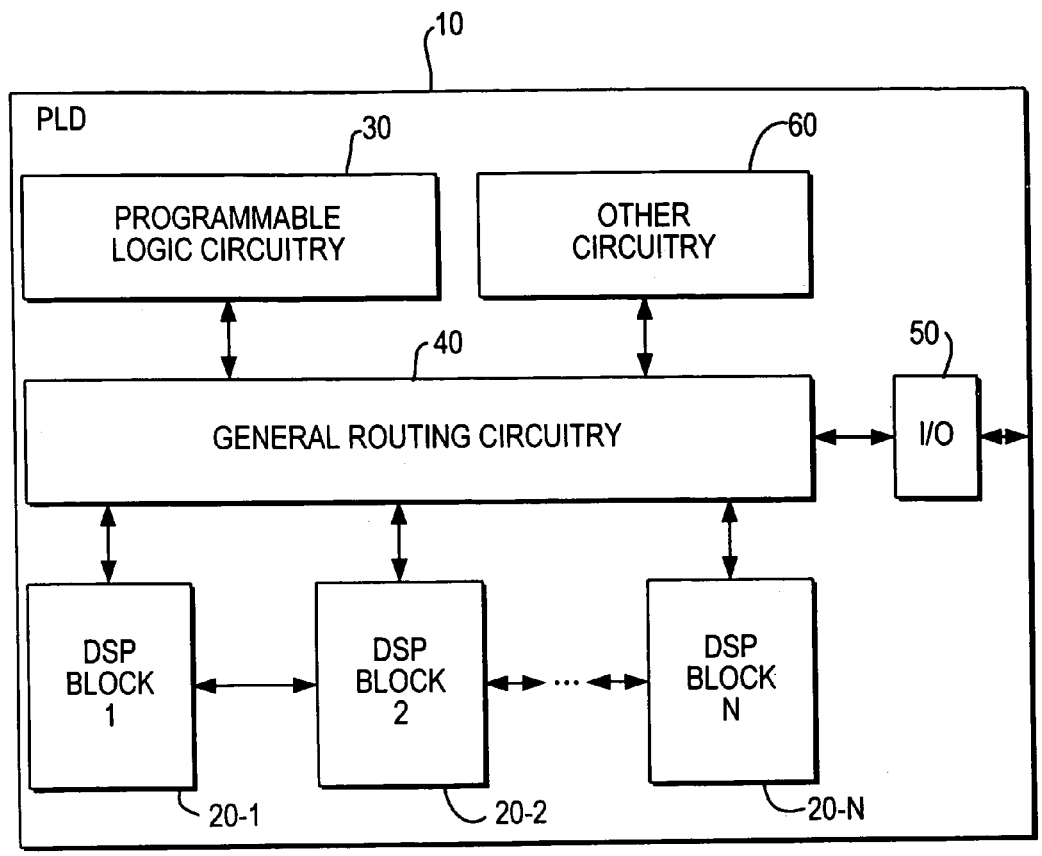
FIG. 1 is a simplified block diagram of an illustrative embodiment of a programmable logic device that can be constructed in accordance with the invention.

An illustrative programmable logic device ("PLD") integrated circuit 10 including digital signal processing ("DSP") blocks 20 in accordance with the invention is shown in FIG. 1. In addition to several DSP blocks 20-1 through 20-N, PLD 10 includes programmable logic circuitry 30, general routing circuitry 40, and I/O circuitry 50. PLD 10 may also include one or more other types of circuitry 60 (e.g., blocks of memory circuitry, microprocessor circuitry, etc.). Programmable logic circuitry 30 is typically programmable to perform any of a wide variety of logic tasks. General routing circuitry 40 is also typically programmable to at least a large degree and is provided to route signals to, from, and/or between other circuitries 20, 30, 50, and 60 (possibly also including between various parts of those other circuitries, such as between various parts of programmable logic circuitry 30). I/O circuitry 50 is provided for making connections between PLD 10 and whatever external circuitry PLD 10 is used with. FIG. 1 also shows that there may be various direct connections between adjacent ones of DSP blocks 20.

Typical of everything that is shown and described herein, FIG. 1 is intended to be illustrative and not limiting. For example, PLD 10 may also include other circuitry and connections that are not shown in FIG. 1, or circuitries or connections shown in FIG. 1 may be omitted if desired. As an example of possible additions to what is shown in FIG. 1, some input signals to PLD 10 may not pass through general routing circuitry 40. Certain high-speed signals (e.g., clock signals) may go directly to the circuit components (e.g., 20, 30, 60, etc.) that need those signals. As another example of possible additions, PLD 10 may include so-called high-speed serial interface ("HSSI") circuitry that is dedicated to converting high-speed serial input signals to a form that is more readily dealt with by the remainder of the circuitry on PLD 10. Such HSSI circuitry may directly receive data signals from external sources without those data signals passing through any general routing circuitry 40. As still another example of a possible addition to what is shown in FIG. 1, other connections between various circuitries on the device may be provided if desired. For example, more direct connections (i.e., not via general routing circuitry 40) may be provided between DSP blocks 20 and programmable logic circuitry 30, between DSP blocks 20 and I/O circuitry 50, and/or between DSP blocks 20 and other circuitry 60.

Figure 2:
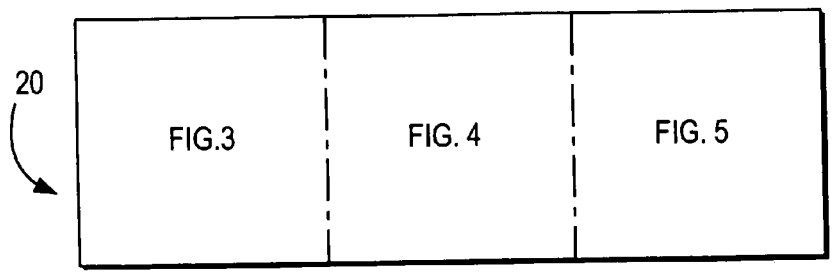
FIG. 2 is a diagram showing how
Figure 3:
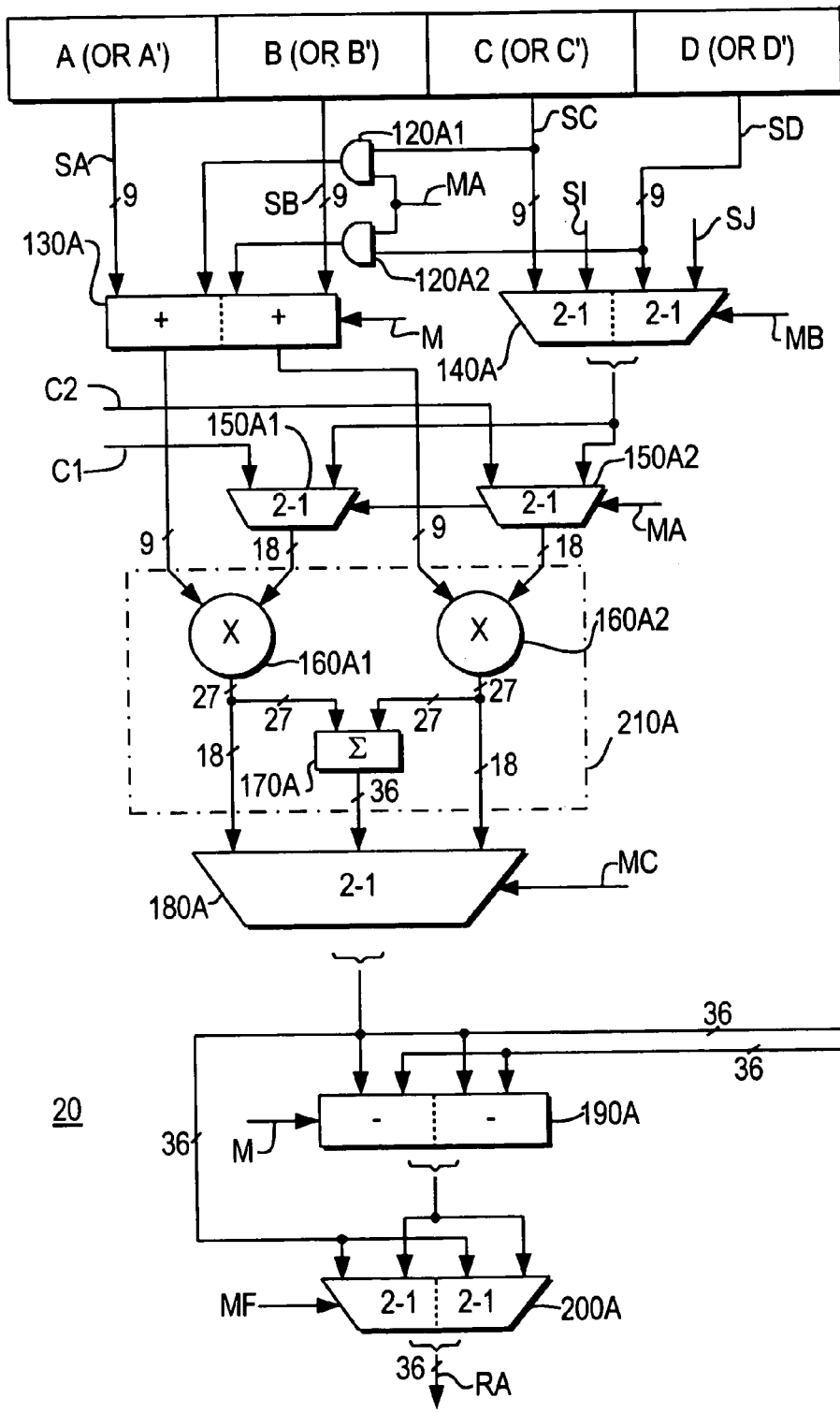
FIGS. 3-5 are intended to be put together to produce a larger drawing of an illustrative embodiment of circuitry in accordance with the invention.
Figure 4:
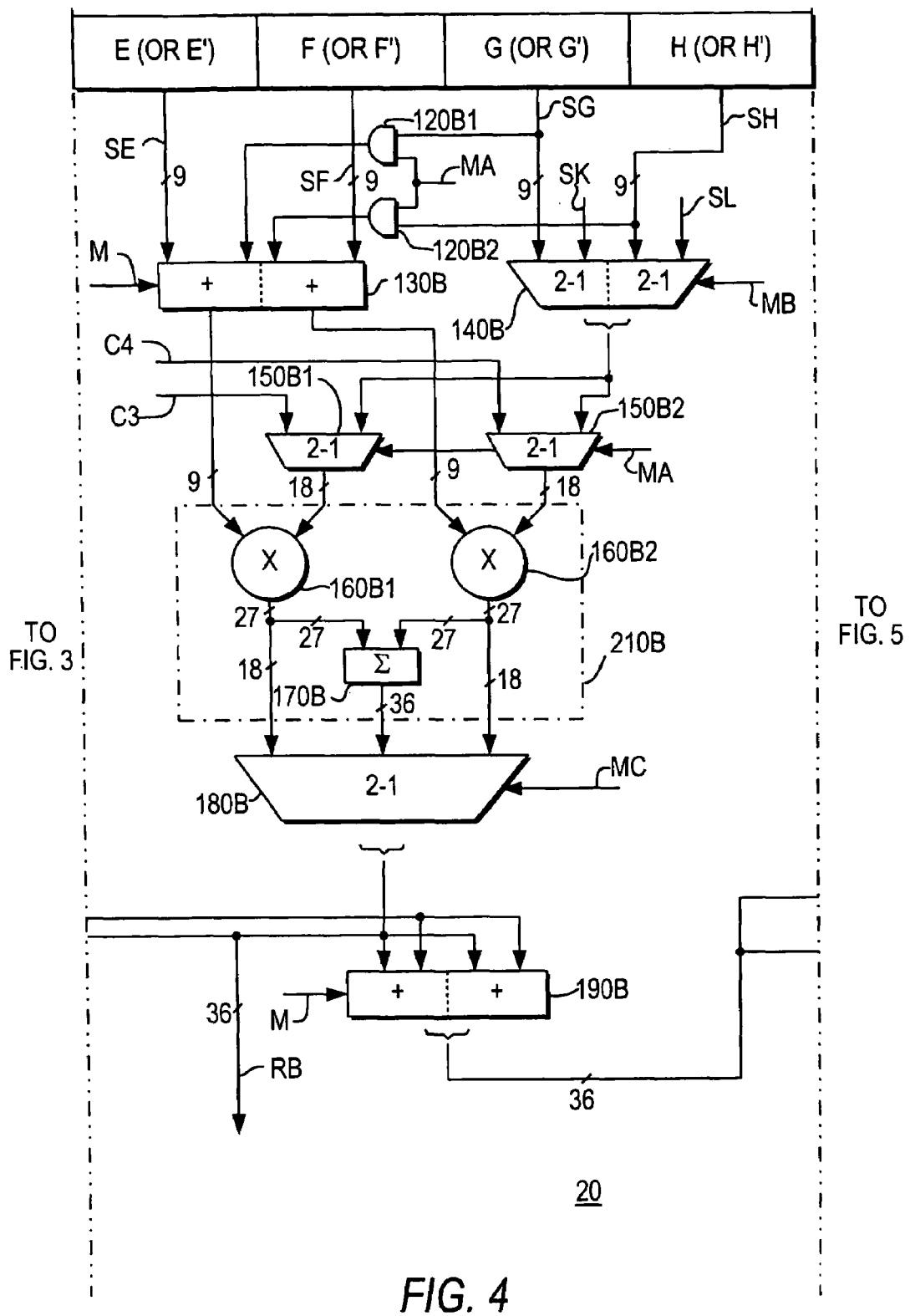
Figure 5:
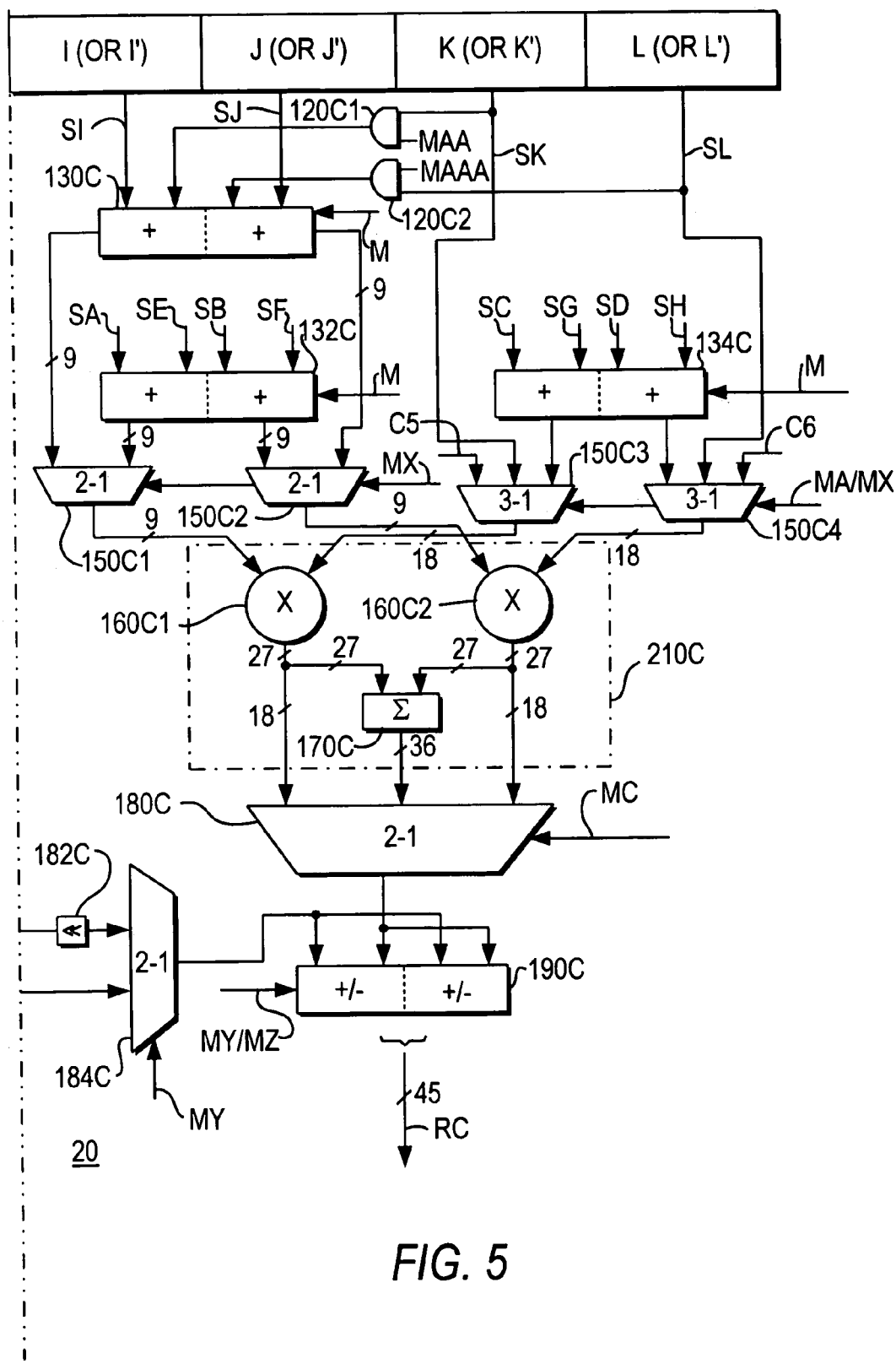
Figure 6:
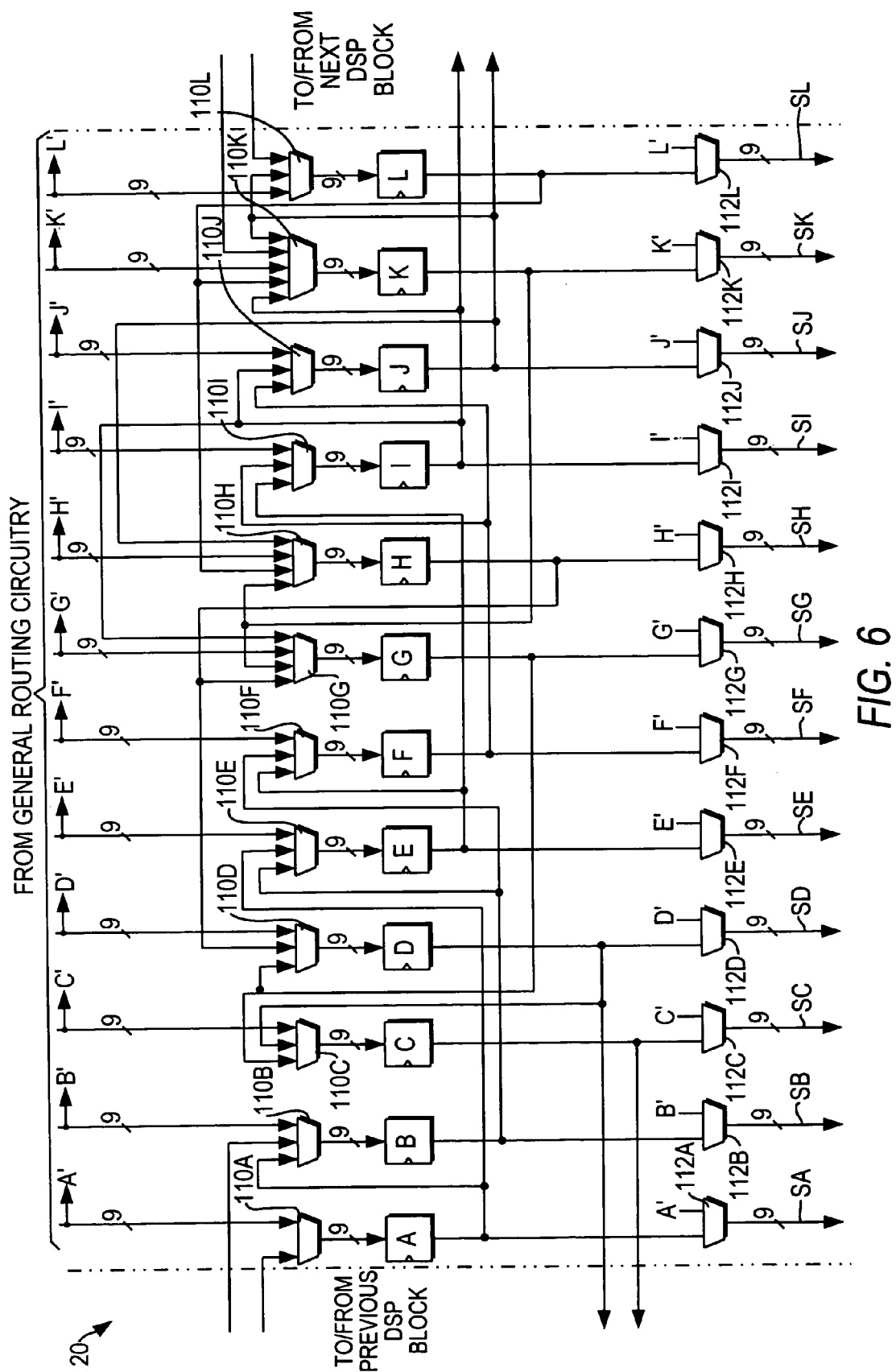
FIG. 6 is a simplified schematic block diagram showing additional aspects of circuitry of the type shown in FIGS. 3-5 in accordance with the invention.

FIG. 2 shows how FIGS. 3-5 can be assembled to produce one larger drawing illustrating major portions of one representative DSP block 20 in accordance with the invention. Additional details regarding a portion of the DSP block circuitry are shown in FIG. 6. DSP block 20 is capable of many different modes of operation. To some extent these various mode are selectable by mode control signals. Not all of these mode control signals are specifically shown in all of the FIGS. But to the extent that they are shown, references for them tend to begin with the letter M. These mode control signals can come from programmable sources (e.g., random access memory ("RAM") bits), which are therefore static or relatively static; or they can come from more dynamic signal sources, such as time-varying logic signals.

As shown across the tops of FIGS. 3-5, a representative DSP block 20 "begins" with 12 9-bit data inputs A-L (or A'-L'). Inputs A-L refer to the contents (and therefore outputs) of register circuits A-L. Inputs A'-L' refer to similar inputs from ultimate sources that can be generally similar, but with registers A-L bypassed (see FIG. 6, which shows both registers A-L and multiplexers 112A-L for allowing inputs A'-L' from general routing circuitry 40 (FIG. 1) to bypass registers A-L if desired). Multiplexers 112 are controlled by one or more mode control signal (not shown, but like other mode control signals that are shown and described throughout this specification) to select either their registered or unregistered sets of inputs as the signals they pass to their outputs. Although the inputs to the remainder of the DSP block circuitry can thus be either registered or unregistered, for simplicity in the following further discussion it will frequently be assumed that these inputs have been registered. But all references herein to outputs of registers A-L will be understood to also include the unregistered alternatives A'-L', unless that is inconsistent with a particular context.

As mentioned above, registers A-L are shown again in FIG. 6 with the circuitry that supplies signals to them. All of registers A-L are clocked at the same time by a clock signal that is not shown separately in FIGS. 3-6 (except for the clock signal input symbol on the left in each of the registers as shown in FIG. 6). Each of registers A-L is fed by nine bits of data in parallel that are output by the multiplexer 110 (FIG. 6) associated with that register. Each of multiplexers 110 is controlled by one or more mode control signals (not specifically shown in FIG. 6) to select one of its sets of input signals (always nine in number) to be used as its output signals, and therefore as the signals that will be stored by the associated register A-L in response to the next clock signal pulse applied to the registers. For example, multiplexer 110A can select either nine signals that have been output by the "previous" DSP block 20 or nine signals A' from general routing circuitry 40 (FIG. 1) as the nine data signals to be stored by register A in response to the next clock signal pulse applied to the registers. As has been mentioned, the selection made by multiplexer 110A is controlled by the state (logic level) of a mode control signal applied to multiplexer 110A (although this mode control signal is not specifically shown in FIG. 6).

As another example of what is shown in FIG. 6, multiplexer 110E can select as its output signals for storage by register E any one of the following three sets of inputs to multiplexer 110E: (1) the nine data bits currently being output by register A, (2) the nine bits currently being output by register B, or (3) nine bits E1 from general routing circuitry 40. Thus FIG. 6 shows that each of registers A-L can be loaded either from general routing circuitry 40 or from certain other ones of the registers, either in the same DSP block 20 or in an adjacent one of the DSP blocks 20. The significance of the various possibilities for routing signals from one register to another will become more apparent as the discussion proceeds. FIG. 6 also shows (as has already been mentioned) that registers A-L can be completely bypassed by using multiplexers 112A-L to output unregistered inputs A'-L' rather than registered data A-L.

The output signals of each of multiplexers 112A-L are identified by the reference S followed by the letter of the associated register output or unregistered input. For example, SJ identifies the nine data output signals of register J or the nine inputs J' (if register J has been bypassed). In FIGS. 3-5 input signals that are labelled in this way have come from the associated multiplexer 112, even though a complete connection from the multiplexer is not shown.

Turning now to FIGS. 3-5, each of these FIGS. shows the circuitry that is basically associated with a respective one of three multiplier circuits 210A, 210B, and 210C in the depicted DSP block 20 (although it will soon be apparent that there is also some signal sharing among these three portions of the DSP block circuitry in some modes of operation of that circuitry). Detailed consideration will first be given to FIG. 3.

FIG. 3 shows the first four registers A-D (assumed hereinafter to also include bypass multiplexers 112A-D), together with multiplier 210A. Also shown with multiplier 210A in FIG. 3 is adder circuitry 130A. In conjunction with logic gates 120A1 and 120A2 (which can output either all zeros or SC and SD, depending on the state of mode control signal MA), adder 130 is capable of any of the following modes of operation: (1) pass SA and SB separately, (2) add SA and SC and separately add SB and SD (i.e., two separate 9-bit additions), or (3) add SA,SB and SC,SD (i.e., one 18-bit addition in which SA are the higher order bits of the first addend, SB are the lower order bits of that addend, SC are the higher order bits of the second addend, and SD are the lower order bits of that addend). In general, a vertical dotted line through an element in any of the FIGS. herein means that the two halves of the element can operate either separately or together (as has been described for adder 130A, which has such a vertical dotted line through it). The selection between alternatives (2) and (3) earlier in this paragraph is made by the mode control signal M applied to adder 130A. Mode control signal M determines whether a carry chain between two halves of adder 130A is broken or not. If the carry chain is broken, the adder performs two separate additions. If the carry chain is not broken, the adder performs one longer addition. Mode control operates similarly for all adders (including subtractors) shown throughout the drawings. Such mode control will be shown in the drawings but is generally not mentioned again because it is covered by this explanation.

Also shown with multiplier 210A in FIG. 3 is multiplexer circuitry 140A. Multiplexer circuitry 140A is capable of either of two modes of operation, depending on the state of mode control signal MB: (1) passing SC and SD, or (2) passing SI and SJ. The notation "2-1" in multiplexers shown in any of the FIGS. herein identifies those components as 2-to-1 multiplexers, i.e., elements that can select either one of two sets of input signals to be the output signals of the element.

Still further shown in FIG. 3 with multiplier circuitry 210A are multiplexers 150A1 and 150A2. Both of these multiplexers are shown having the same mode control (MA) as logic gates 120A1 and 120A2. It will be understood, however, that throughout the FIGS. herein any mode controls shown as common can instead be different and therefore independent if that is consistent with a desired objective. Similarly, any mode controls shown as different and therefore independent in any of the FIGS. herein can instead be common and therefore not independent if that is consistent with a desired objective. Depending on its mode control signal, each of multiplexers 150A1 and 150A2 outputs either its C1/C2 input signals or signals it receives from multiplexer 140A. Throughout the drawings herein, signals with references that begin with C (e.g., C1 and C2) can be among the signals that come from general routing circuitry 40 (FIG. 1).

Multiplier circuitry 210A includes two multiplication subcircuits 160A1 and 160A2 and summation circuitry 170A. Each of multiplication subcircuits 160 is capable of multiplying up to nine bits of data on one of its sets of input leads (from adder circuitry 130A) by up to 18 bits of data on the other of its sets of input leads (from the associated multiplexer 150). For example, multiplication subcircuit 160A1 can multiply nine bits of data from adder 130 by nine bits of data from multiplexer 150A1 to produce an 18-bit product on the 18 left-most output leads of multiplier 210A. As another example, multiplication subcircuit 160A1 can multiply nine bits of data from adder 130A by 18 bits of data from multiplexer 150A1 to produce a 27-bit product applied to summation circuitry 170A. It will be appreciated that the nine or 18 bits from multiplexer 150A1 mentioned in the two preceding sentences can come either from C1 (i.e., general routing circuitry 40 in FIG. 1) or from selected ones of SC, SD, SI, and SJ. More particularly, if only nine bits are applied to multiplication subcircuit 160A1 via multiplexers 140A and 150A1, those nine bits can come from either SC or SI. But if 18 bits are applied via that routing, those bits can come from either SC and SD or SI and SJ.

Multiplication subcircuit 160A2 has similar functional capabilities with respect to the signals it can receive from its various data sources. In other words, multiplication subcircuit 160A2 can multiply nine bits of data from adder 130A by (1) nine bits of data from C2, (2) 18 bits of data from C2, (3) nine bits of data from SD, (4) nine bits of data from SJ, (5) 18 bits of data from SC and SD, or (6) 18 bits of data from SI and SJ.

In addition to being kept separate for the products of two separate 9×9 multiplications, the outputs of multiplication subcircuits 160A1 and 160A2 are arithmetically combined by summation circuitry 170A in such a way that multiplier circuitry 210A is capable of performing one 18-by-18 multiplication. In particular, summation circuitry 170A adds the outputs of multiplication subcircuit 160A1 (a first 9×18 product) to the outputs of multiplication subcircuit 160A2 (a second 9×18 product), with the former outputs (from 160A1) shifted to the left nine places relative to the latter outputs. Thus, if the 18 bits output by adder 130 represent one 18-bit number to be multiplied, and if the other inputs to both of multiplication subcircuits 160A1 and 160A2 represent another 18-bit number to be multiplied, the outputs of summation circuitry 170A will be the 36-bit product of that multiplication. The second of the above-mentioned numbers to be multiplied can be the same for both of subcircuits 160A by making C1 and C2 the same, if that is the source of the second number. Or the source of the second number can be SC and SD or SI and SJ. Multipliers even bigger than 18×18 can be realized in the circuitry shown herein, as will be discussed later in this specification.

Continuing with the discussion of FIG. 3, multiplexer circuitry 180A can select either the separate outputs of multiplication subcircuits 160A1 and 160A2 or the outputs of summation circuitry 170A for outputting to further circuitry. Multiplexer 180A is controlled by mode control signal MC. Outputs of multiplexer 180A are applied to subtraction circuitry 190A, adder circuitry 190B (FIG. 4), and multiplexer circuitry 200A. Multiplexer circuitry 200A selects outputs of either multiplexer 180A or subtractor 190A as the final, principal outputs RA for FIG. 3. Multiplexer 200A is controlled by mode control signal MF. The outputs of multiplexer 200A may go back to general routing circuitry 40 (FIG. 1) for routing to any other part of the circuitry. In some of the relatively simple modes of operation of the FIG. 3 circuitry, subtractor 190A is bypassed and multiplexers 180A and 200A cooperate to output via multiplexer 200A either the separate outputs of subcircuits 160A1 and 160A2 or the outputs of summation circuitry 170A. Thus in these relatively simple modes, the outputs of multiplexer 200A can be either (1) two separate 18-bit products (of two separate 9×9 multiplications), or (2) one 36-bit product (of one 18×18 multiplication). Other more complicated modes of operation, including those that employ subtractor 190A, will be discussed later in this specification.

The circuitry shown in FIG. 4 is very similar to what is shown in FIG. 3 and described above. The description of FIG. 4 can therefore be somewhat abbreviated. Elements in FIG. 4 that are similar to elements in FIG. 3 have the same reference numbers in both FIGS., the suffix letter A in FIG. 3 being changed to B in FIG. 4.

Adder circuitry 130B receives SE and SF. Adder 130B also receives the outputs of logic gates 120B1 and 120B2. Logic gates 120B1 logically combine mode control signal MA with SG. Logic gates 120B2 similarly logically combine mode control signal MA with SH. In cooperation with logic gates 120B, adder 130B can either pass SE and SF, or it can add those signals to SG and SH. This addition can be either two separate nine-bit additions (SE+SG and SF+SH) or one 18-bit addition (SE,SF+SG,SH).

Multiplexer 140B can output either SG and SH or SK and SL, depending on the state of mode control signal MB.

Multiplexers 150B1 and 150B2 can output either signals from multiplexer 140B or signals C3 and C4 (from general routing circuitry 40 (FIG. 1)), depending on the state of mode control signal MA.

Multiplier circuitry 210B includes multiplication subcircuits 160B1 and 160B2. Each of subcircuits 160B is capable of performing, for example, either a 9×9 multiplication or a 9×18 multiplication on the signals applied to it. Summation circuitry 170B combines the outputs of subcircuits 160B1 and 160B2 to effect an 18×18 multiplication, assuming that the signals applied to subcircuits 160B are appropriate for such a multiplication.

Multiplexer 180B, controlled by mode control MC, selects for outputting either the separate outputs of subcircuits 160B1 and 160B2 or the outputs of summation circuitry 170B. The outputs of multiplexer 180B are the RB outputs of FIG. 4, which can be applied to general routing circuitry 40 (FIG. 1) for use wherever needed in PLD 10. The outputs of multiplexer 180B are also applied to adder circuitry 190B for addition to outputs of multiplexer 180A (FIG. 3) in more complicated modes of operation that will be described later in this specification. The outputs of adder 190B are applied to circuitry shown in FIG. 5 as discussed below.

From the foregoing, it will be seen that the circuitry shown in FIG. 4 has all the capabilities described above for FIG. 3.

The circuitry shown in FIG. 5 again has some similarities to the FIG. 3 and FIG. 4 circuitry. Elements in FIG. 5 that are generally similar to FIG. 3 and FIG. 4 elements have the same reference numbers in FIG. 5, but with the suffix letter C rather than suffix letter A or B. Elements in FIG. 5 that have no direct counterparts in FIGS. 3 and 4 have reference numbers that are not used in FIGS. 3 and 4. Although there are thus some differences between what is shown in FIG. 5, on the one hand, and FIGS. 3 and 4, on the other hand, the discussion of FIG. 5 can be somewhat abbreviated due to the presence of some similarities to what has already been discussed.

As shown in FIG. 5, SI and SJ are applied to adder circuitry 130C. The outputs of logic gates 120C1 and 120C2 are also applied to adder 130C. Logic gates 120C can output either all zeros or SK and SL, depending on the states of mode control signals MAA and MAAA. If logic gates 120C are outputting zeros, then adder 130C passes through SI and SJ unaltered. If logic gates 120C are outputting SK and SL, then adder 130C adds the inputs it receives, either as SI+SK and SJ+SL, or as SI,SJ+SK,SL, as desired by the user. It is also possible for either set of logic gates 120C1 and 120C2 to output zeros, while the other set of those gates passes its other inputs (SK or SL). In that case, one side of adder 130C performs an addition, while the other side of that adder acts as a pass through (for SI or SJ).

The circuitry shown in FIG. 5 also includes alternative adder circuitry 132C and alternative adder circuitry 134C. Operationally, each of adders 132C and 134C is like adder 130C, although they all operate on different sets of inputs. Adder 132C can add SA, SB, SE, and SF, either as SA+SE and SB+SF or as SA,SB+SE,SF. Adder 134C can add SC, SD, SG, and SH, either as SC+SG and SD+SH or as SC,SD+SG,SH.

The next elements in FIG. 5 are multiplexers 150C1-4. Multiplexers 150C1 and 150C2 can output either the outputs of adder 130C or the outputs of adder 132C, depending on the state of mode control signal MX. Multiplexers 150C3 and 150C4 can output either (1) SK and SL, (2) the outputs of adders 134C, or (3) C5 and C6 (from general routing circuitry 40 (FIG. 1)), depending on the states of mode control signals MA and MX.

The outputs of multiplexer 150C1 are one set of inputs to multiplication subcircuit 160C1 in multiplier circuit 210C. The outputs of multiplexer 150C3 are the other set of inputs to that subcircuit. The outputs of multiplexer 150C2 are one set of inputs to multiplication subcircuit 160C2. The outputs of multiplexer 150C4 are the other set of inputs to that subcircuit. Each of subcircuits 160C1 and 160C2 multiplies its two sets of inputs. For example, each subcircuit 160C can perform a 9-by-9 multiplication to produce an 18-bit product, or a 9-by-18 multiplication to produce a 27-bit product.

Summation circuitry 170C adds the 27-bit products output by subcircuits 160C1 and 160C2. As in the case of other similar circuitries 170A and 170B, this is done in such a way that multiplier 210C can perform up to an 18-by-18 multiplication (assuming that the inputs to subcircuits 160C1 and 160C2 are appropriate for such a multiplication).

Multiplexer 180C can output either the separate outputs of subcircuits 160C1 and 160C2, or the outputs of summation circuitry 170C, depending on the state of mode control signal MC.

The outputs of multiplexer 180C are applied to add/subtract circuitry 190C. The other inputs to add/subtract circuitry 190C have come from adder 190B in FIG. 4 via elements 182C/184C in FIG. 5. Element 182C produces a left-shifted version of adder 190B outputs for reasons that will be apparent from later discussion. Multiplexer 184C outputs either the unshifted outputs of adder 190B or the left-shifted version of those outputs produced by element 182C, depending on the state of mode control signal MY. Add/subtract circuit 190C is basically like any of the adder or subtractor circuits (e.g., 130A-C, 132C, 134C, 190A, or 190B), except that add/subtract circuit 190C can either add or subtract the inputs applied to it, as desired by the user. Additional mode control MZ for circuit 190C allows the outputs of circuit 184C to be zeroed if not used. For example, if the inputs to add/subtract circuit 190C are labelled a-d from left to right, then that circuit can produce any of the following outputs: (1) a+b and c+d, (2) a−b and c−d, (3) a,c+b,d, or (4) a,c−b,d. The outputs of add/subtract circuit 190C are signals RC, which are applied to general routing circuitry 40 (FIG. 1) for routing to whatever elements on PLD 10 need signals RC for further use. Add/subtract circuit 190C is preferably "wider" than other adder circuits so that it can handle additions (or subtractions) that include dealing with the outputs of left-shift circuitry 182C. Circuit 190C has a "wider-than-normal" output bus for this same reason. (To avoid having to provide too many dedicated RC output connections to general routing circuitry 40 (FIG. 1), some of the RB (FIG. 4) output connections to circuitry 40 can be "stolen" for some of the RC bits when more than 36 RC outputs are in use. Such "extra" RC bits can be multiplexed onto RB output leads using a multiplexer (not shown) that is controlled by mode control signal MZ.)

FIGS. 7-15 are greatly simplified drawings showing several illustrative modes of operating circuitry of the type shown in FIGS. 1-6.

Figure 7:
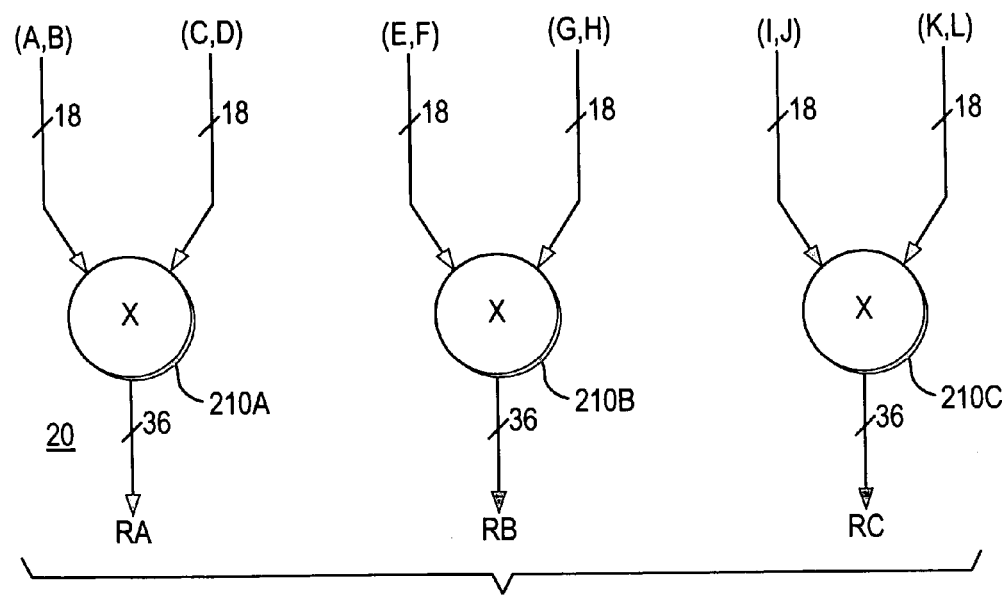
FIG. 7 shows an illustrative use or configuration of a DSP block in accordance with the invention.

FIG. 7 shows use of one DSP block 20 to perform three, separate, 18×18 multiplications. For example, the left-most one-third of FIG. 7 corresponds to use of the FIG. 3 circuitry to multiply SA and SB by SC and SD to produce a 36-bit product RA. Similarly, the center one-third of FIG. 7 corresponds to use of the FIG. 4 circuitry to multiply SE and SF by SG and SH to produce 36-bit product signals RB. And the right-most one-third of FIG. 7 corresponds to use of the FIG. 5 circuitry to multiply SI and SJ by SK and SL to produce 36-bit product signals RC.

Figure 8:
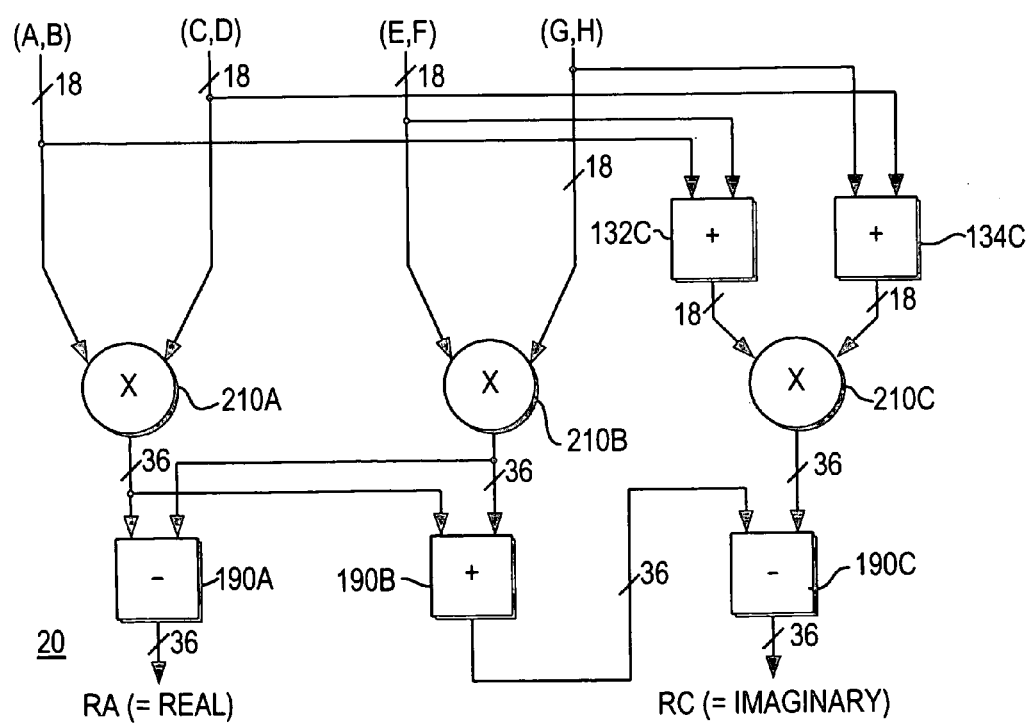
FIG. 8 shows another illustrative use or configuration of a DSP block in accordance with the invention.

FIG. 8 illustrates use of a DSP block 20 to multiply two complex numbers, each having 18 bits of precision. The usual equation for such a multiplication is (a+bi) (c+di)=(ac−bd)+(ad+bc)i. But the right-hand side of this equation can also be expressed as (ac−bd)+((a+b) (c+d)−ac−bd)i. Note that four multipliers are required to perform the first form of this type of operation (a times c, b times d, a times d, and b times c), but for the second form of this operation only three multipliers are required (a times c, b times d, and (a+b) times (c+d)). FIG. 8 shows how a DSP block 20 can perform this second form of this operation (where 18-bit variable $\underline{a}$ is SA and SB, 18-bit variable $\underline{b}$ is SC and SD, 18-bit variable $\underline{c}$ is SE and SF, and 18-bit variable $\underline{d}$ is SG and SH. The "real" part of the complex product is output via leads RA; the "imaginary" part of the complex product is output via leads RC.

Figure 9:
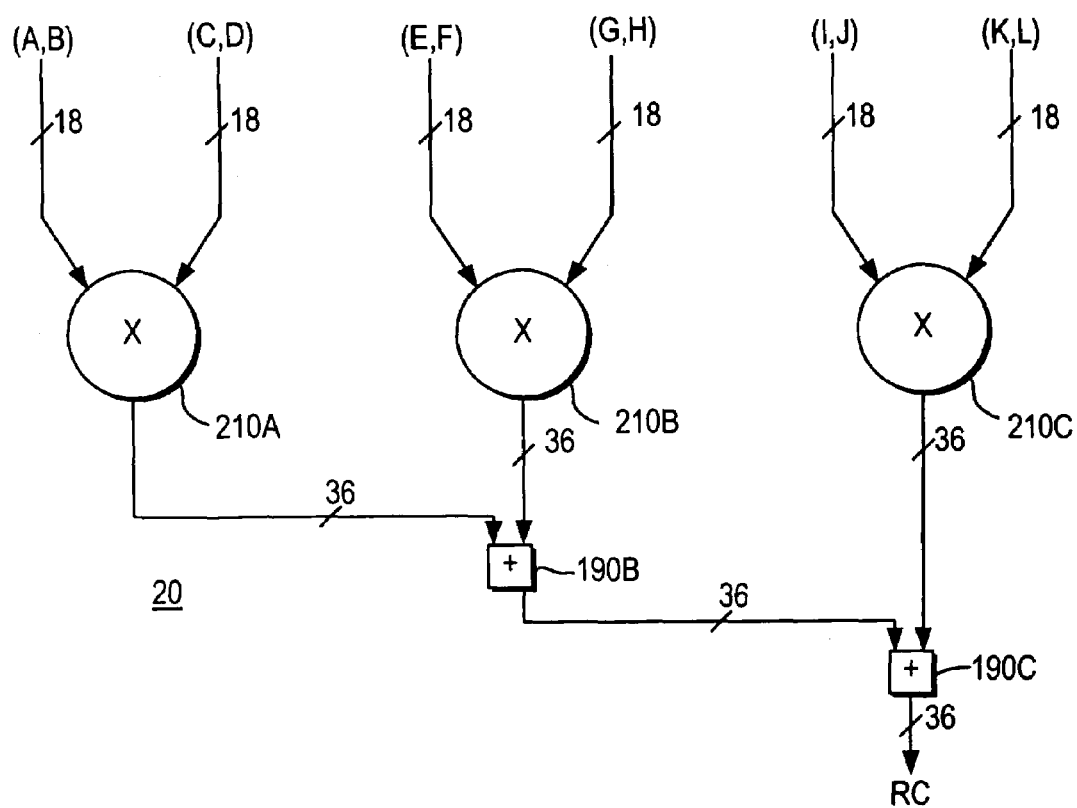
FIG. 9 shows yet another illustrative use or configuration of a DSP block in accordance with the invention.

FIG. 9 shows use of a DSP block 20 to add the products of three 18×18 multiplications. One multiplication is performed by multiplier 210A. A second multiplication is performed by multiplier 210B. A third multiplication is performed by multiplier 210C. Adder 190B adds the products output by multipliers 210A and 210B. Add/subtract circuitry 190C adds that result to the product output by multiplier 210C. The final, 36-bit sum of the three products is output via leads RC. It will be apparent that in addition to what is shown in FIG. 9, the first product or the difference between the first and second products can be made available on leads RA, and the second product can be made available on leads RB. If only the sum of two products is desired, that can be achieved by supplying zero data to one of multipliers 210A, B, or C.

A small amount of additional circuitry would permit another mode of operation very similar to FIG. 9 to be supported. This other mode would be: (1) output 210A via RA, and (2) output the sum of the outputs of 210B and 210C via RC. The additional circuitry required to support this mode could be (1) circuitry for selectively zeroing the inputs to adder 190B (FIG. 4) that came from FIG. 3, or (2) circuitry for allowing the outputs of multiplexer 180B (FIG. 4) to selectively bypass adder 190B on the way to FIG. 5, or (3) any other similar approach.

Figure 10:
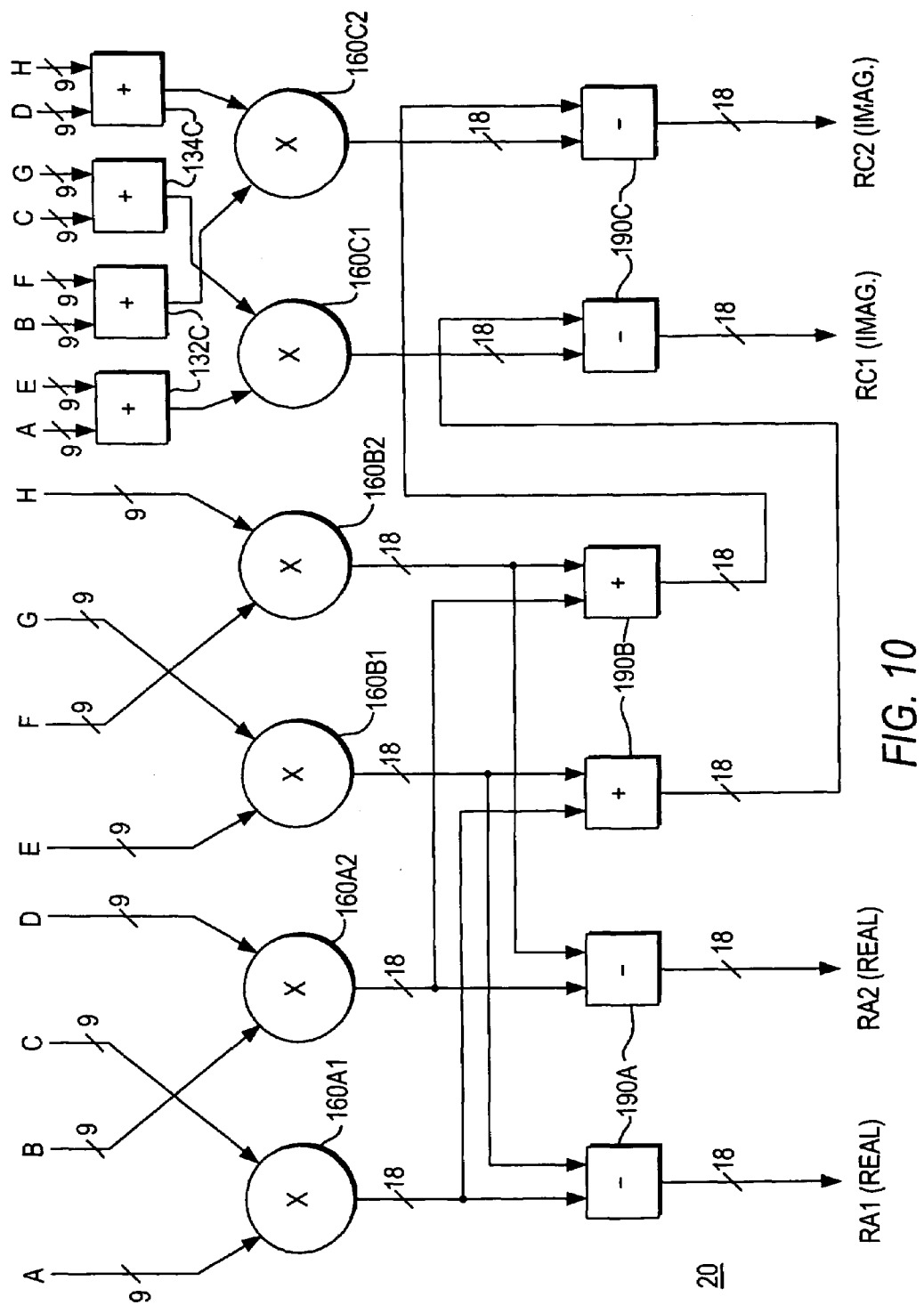
FIG. 10 shows still another illustrative use or configuration of a DSP block in accordance with the invention.

FIG. 10 shows use of a DSP block 20 to perform two, complex, 9×9 multiplications. The same form of the result used for one complex 18×18 multiplication as described above in connection with FIG. 8 is used again here. To help the reader keep track of the two multiplications taking place in FIG. 10, they are first expressed below with indexes 1 and 2 to distinguish them:

$(a1+b1i)(c1+d1i)=(a1c1-b1d1)+((a1+b1)(c1+d1)-a1c1-b1d1)i$ $(a2+b2i)(c2+d2i)=(a2c2-b2d2)+((a2+b2)(c2+d2)-a2c2-b2d2)i$

SA-SH are used for the eight variables in these two multiplications as follows:

| Variable | Signal Source |
|---|---|
| a1 | SA |
| b1 | SE |
| c1 | SC |
| d1 | SG |
| a2 | SB |
| b2 | SF |
| c2 | SD |
| d2 | SH |

It will thus be readily seen how DSP block 20, configured as shown in FIG. 10, forms the real and imaginary parts of these two, 9×9, complex multiplications. For example, the real part of the first multiplication (on output leads RA1 in FIG. 10) is produced by using multiplier 160A1 to multiply SA and SC (values a1 and c1, respectively), by using multiplier 160B1 to multiply SE and SG (values b1 and d1, respectively), and by using the left-hand portion of subtractor 190A to subtract the second of the resulting products from the first. The imaginary part of the first multiplication (on output leads RC1 in FIG. 10) is produced by (1) using the left-hand part of adder 132C to add SA and SE; (2) using the left-hand part of adder 134C to add SC and SG; (3) using multiplier 160C1 to multiply the outputs of these two adder portions; (4) using the left-hand portion of adder 190B to add the outputs of multipliers 160A1 and 160B1; and (5) using the left-hand portion of subtractor 190C to subtract the output of the left-hand portion of adder 190B from the output of multiplier 160C1. The real and imaginary parts of the product of the second multiplication (RA2 and RC2, respectively) are produced similarly and in parallel by the portions of the DSP block circuitry that are not being used to perform the first multiplication.

Figure 11:
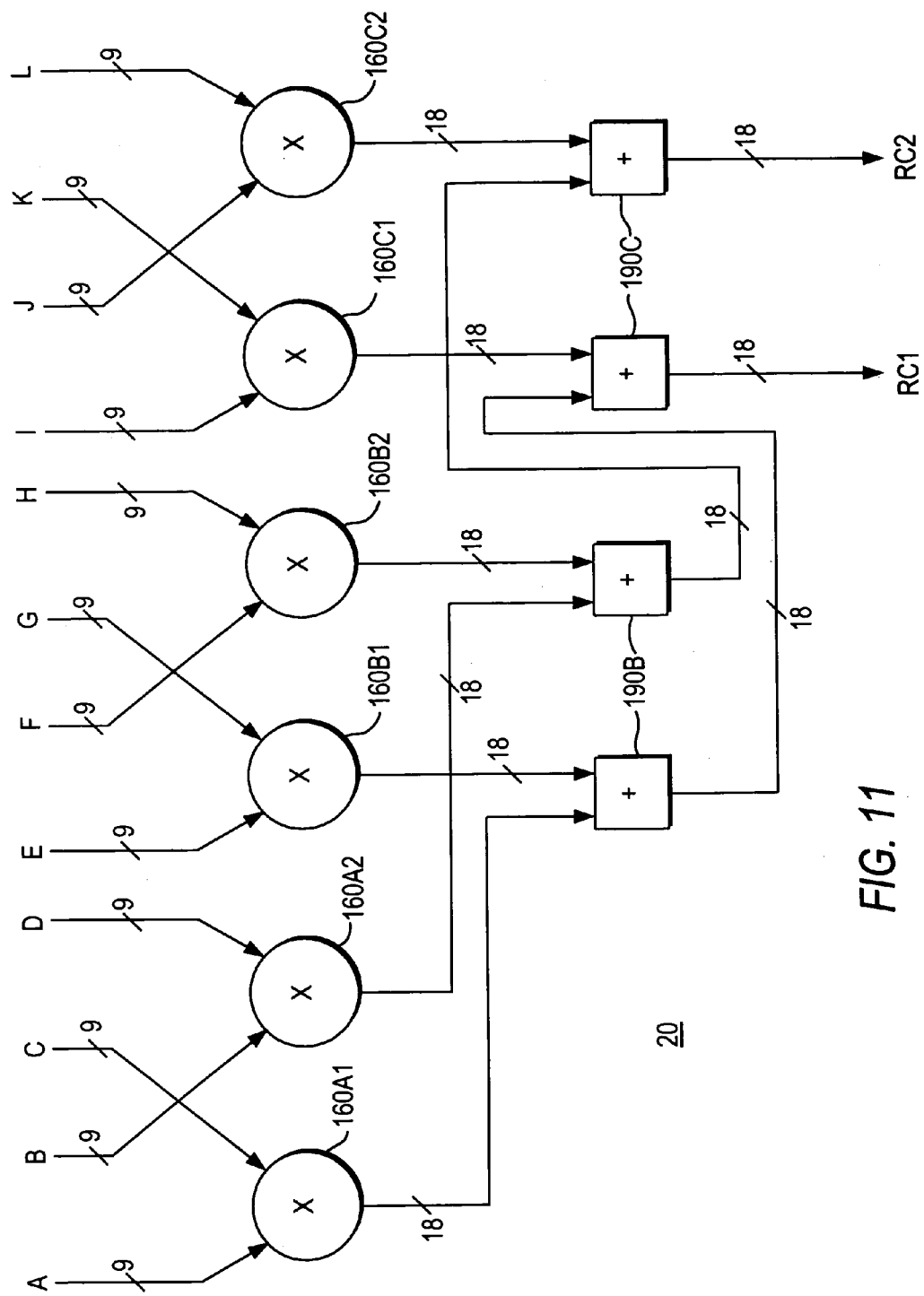
FIG. 11 shows yet another illustrative use or configuration of a DSP block in accordance with the invention.

FIG. 11 shows use of DSP block 20 to perform in parallel, two, 9-bit operations, each similar to the one 18-bit operation shown in FIG. 9. In particular, FIG. 11 shows performing two sets of three 9×9 multiplications and adding together the three products produced in each set as follows:

$SA \times SC + SE \times SG + SI \times SK = RC1$ $SB \times SD + SF \times SH + SJ \times SL = RC2$ The DSP block circuit elements required to perform each part of these operations are identified in FIG. 11, and the flow of information from circuit element to circuit element is also clearly shown in that FIG. It will therefore not be necessary to provide any further description of this illustrative mode of using DSP block 20.

Figure 12:
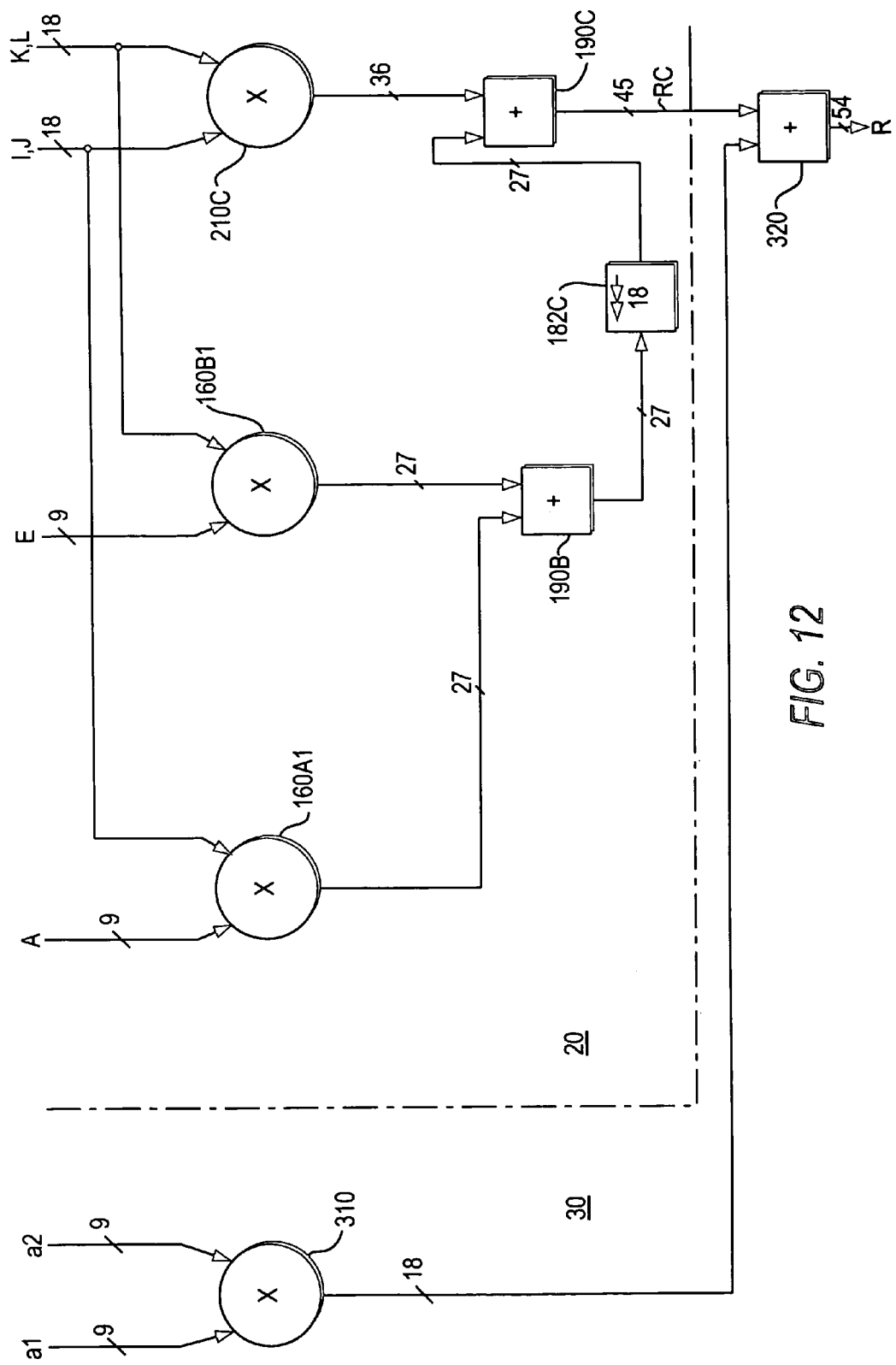
FIG. 12 shows still another illustrative use or configuration of a DSP block in accordance with the invention.

FIG. 12 shows another illustrative use of DSP block 20 in which the DSP block is used to perform part of a 27-bit-by-27-bit multiplication. The other part of such a multiplication can be performed in the programmable logic circuitry 30 on PLD 10 (FIG. 1), as is also shown in FIG. 12.

The 27×27 multiplication to be performed may be expressed in the following form:

$(a1,b1)(a2,b2)=(a1a2)<<36+(a1b2)<<18+ (a2b1)<<18+(b1b2),$ where a1 and a2 are respectively the nine more-significant bits of the two numbers to be multiplied, and b1 and b2 are the 18 less-significant bits of those numbers. The operator <<36 means that the product in the immediately preceding parentheses is shifted left 36 places prior to addition to the other products. The operator <<18 means that the product in the immediately preceding parentheses is shift left 18 places prior to addition to the other products.

In order to use DSP block 20 to carry out part of the above multiplication, the starting values come from signal sources as follows:

| Value | Signal Source(s) |
|---|---|
| a1 | SA |
| b1 | SK, SL |
| a2 | SE |
| b2 | SI, SJ |

Referring now to FIG. 12, multiplier 160A1 is used to form the product a1b2, multiplier 160B1 is used to form the product a2b1, and multiplier 210C is used to form the product b1b2. To provide adequate output bus width, the outputs of multiplier 160A1 are routed out through summation circuitry 170A (not shown again in FIG. 12, but shown in FIG. 3). For similar reasons, the outputs of multiplier 160B1 are routed out via summation circuitry 170B (FIG. 4). Adder 190B adds a1b2 and a2b1. Left shift circuitry 182C shifts the resulting sum to the left by 18 bit positions so that the outputs of adder 190B will be applied to adder 190C with the proper significance for addition to the outputs of multiplier 210C. (The amount of shift provided by circuitry 182C can be different than 18 bit positions if some of the necessary shift is provided elsewhere in the circuitry, e.g., in summation circuitries 170A and 170B.) The outputs of adder 190C are thus (a1b2)<<18+(a2b1)<<18+(b1b2) (each of these terms having been given its correct numerical significance (or order of magnitude position) as part of the addition process). All of the circuitry mentioned in this paragraph is in DSP block 20.

Additional circuitry in programmable logic 30 (FIG. 1) is programmed as a multiplier 310 to form the product a1a2. Still further circuitry in programmable logic 30 is programmed as an adder 320 for adding the RC outputs of DSP block 20 and the outputs of multiplier 310. Again, the outputs of multiplier 310 are applied to adder 320 shifted to positions (in terms of numerical significance) appropriate for addition to RC. In particular, the outputs of multiplier 310 must be shifted left 36 bit positions for addition to RC. The final result R is 54 bits.

Figure 13:
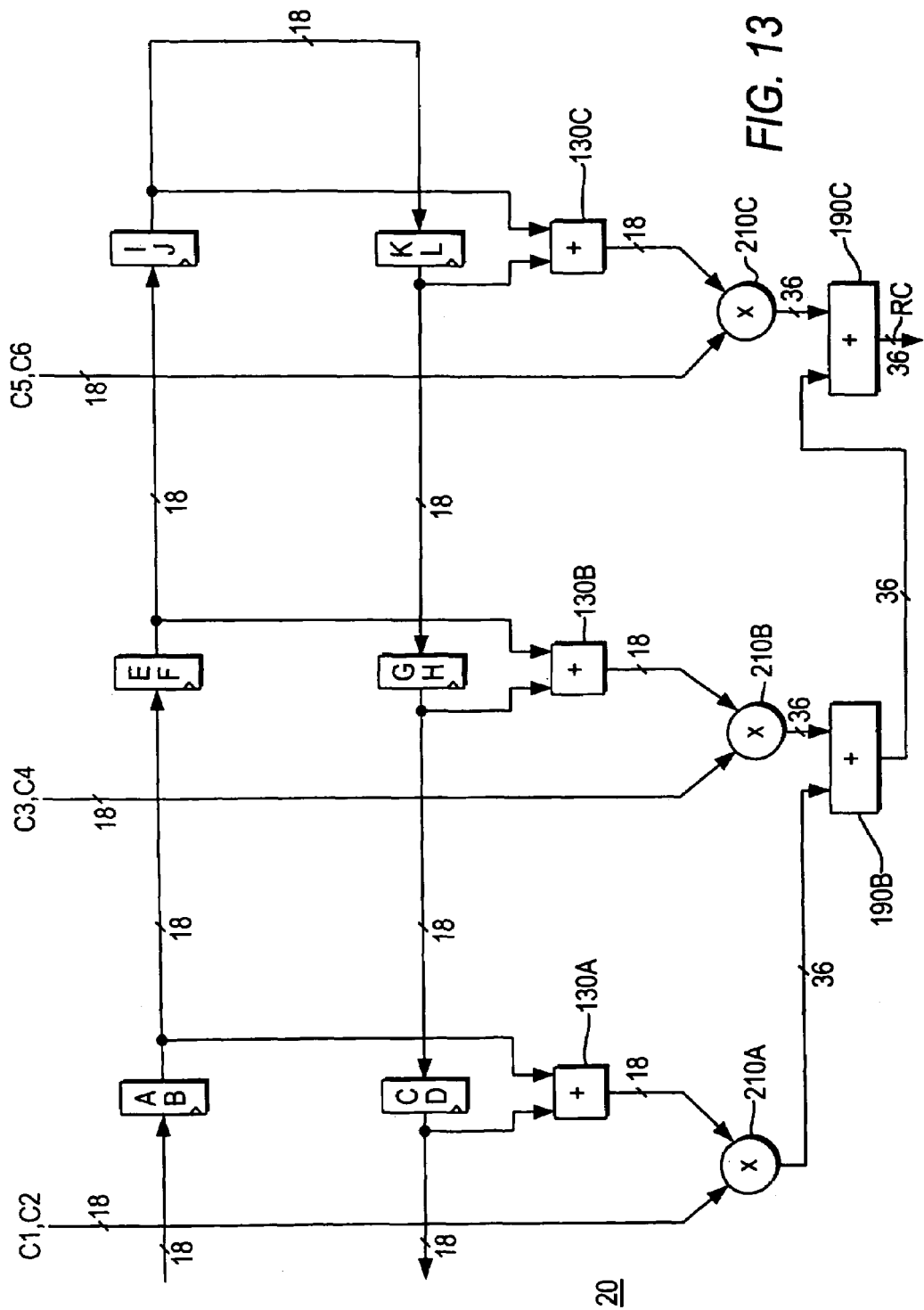
FIG. 13 shows yet another illustrative use or configuration of a DSP block in accordance with the invention.

FIG. 13 shows the use of DSP block 20 to perform the operations needed to provide a symmetrical finite impulse response ("FIR") filter of even order operating on 18-bit data samples. Successive 18-bit samples are shifted successively through registers A,B; E,F; I,J; K,L; G,H; and C,D in synchronism with a clock signal applied to all of those registers. It will be noted that FIG. 6 shows that registers A-L can be interconnected through multiplexers 110A-L to produce this routing of data through the registers. For example, when the type of operation shown in FIG. 13 is desired, multiplexer 110E in FIG. 6 is controlled (e.g., programmed) to apply the output signals of register A to the inputs of register E, and multiplexer 110F is similarly controlled to apply the output signals of register B to the inputs of register F.

Continuing with FIG. 13, adder 130A is used to add the outputs of registers A and B to the outputs of registers C and D. Adder 130B is used to add the outputs of registers E and F to the outputs of registers G and H. Adder 130C is used to add the outputs of registers I and J to the outputs of registers K and L.

Multiplier 210A is used to multiply the outputs of adder 130A by a first filter coefficient (C1,C2) supplied from general routing circuitry 40 (FIG. 1). Multiplier 210B is used to multiply the outputs of adder 130B by a second filter coefficient (C3,C4) supplied from general routing circuitry 40. Multiplier 210C is used to multiply the outputs of adder 130C by a third filter coefficient (C5,C6) supplied from general routing circuitry 40.

Adder 190B is used to add the outputs of multipliers 210A and 210B. Adder 190C is used to add the outputs of adder 190B and multiplier 210C. Outputs RC are the FIR filter outputs.

Figure 14:
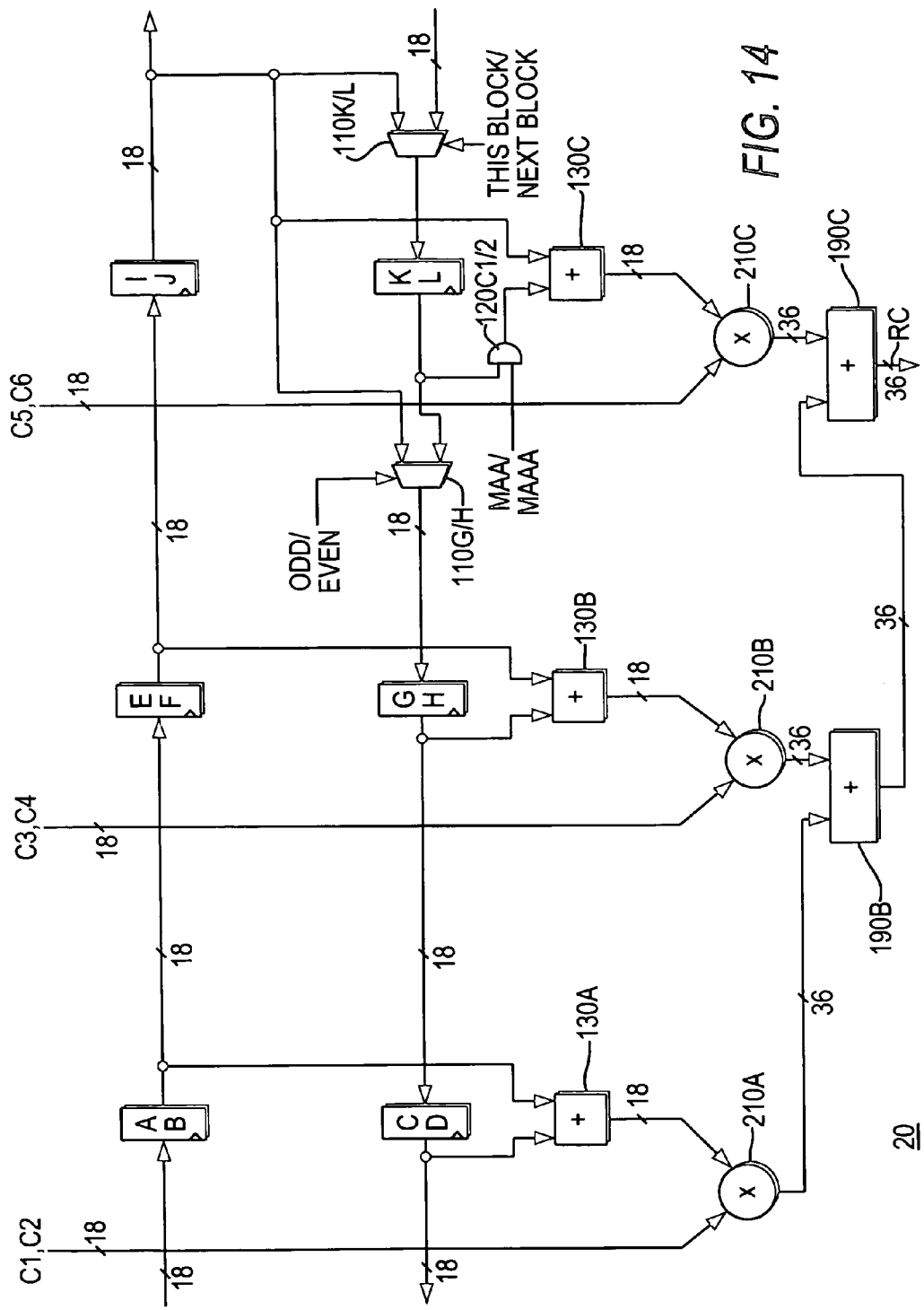
FIG. 14 shows still another illustrative use or configuration of a DSP block in accordance with the invention.

FIG. 14 shows that other circuitry of DSP block 20 allows the block to be used for either an even-order, symmetrical FIR filter (as has already been shown in FIG. 13 and described above) or an odd-order, symmetrical FIR filter operating on 18-bit samples. FIG. 14 is the same as FIG. 13 except that it also shows some capabilities of the multiplexers 110G, 110H, 110K, and 110L that are shown more completely in FIG. 6. FIG. 14 also shows logic gates 120C1 and 120C2 (shown more completely in FIG. 5). When an even-order, symmetrical FIR filter operating on 18-bit samples is desired (as in FIG. 13), multiplexers 110K/L are controlled to apply the outputs of registers I,J to the inputs of registers K,L; multiplexers 110G/H are controlled to apply the outputs of registers K,L to the inputs of registers G,H; and logic gates 120C1/2 are enabled by mode control signals MAA and MAAA. This configures the circuitry as shown in FIG. 13 and as described earlier. When an odd-order, symmetrical FIR filter operating on 18-bit samples is desired, the state of multiplexers 110K/L does not matter; multiplexer 110G/H are controlled to apply the outputs of registers I,J to the inputs of registers G,H; and logic gates 120C1/2 are disabled by mode control signals MAA and MAAA. Successive 18-bit samples are therefore shifted successively through registers A,B; E,F; I,J; G,H; and C,D. Registers K,L are bypassed. The outputs of registers I,J pass through adder 130C unaltered for multiplication by coefficient C5,C6 in multiplier 210. The other parts of the FIG. 14 circuitry operate as described earlier for the corresponding parts of FIG. 13.

Figure 15:
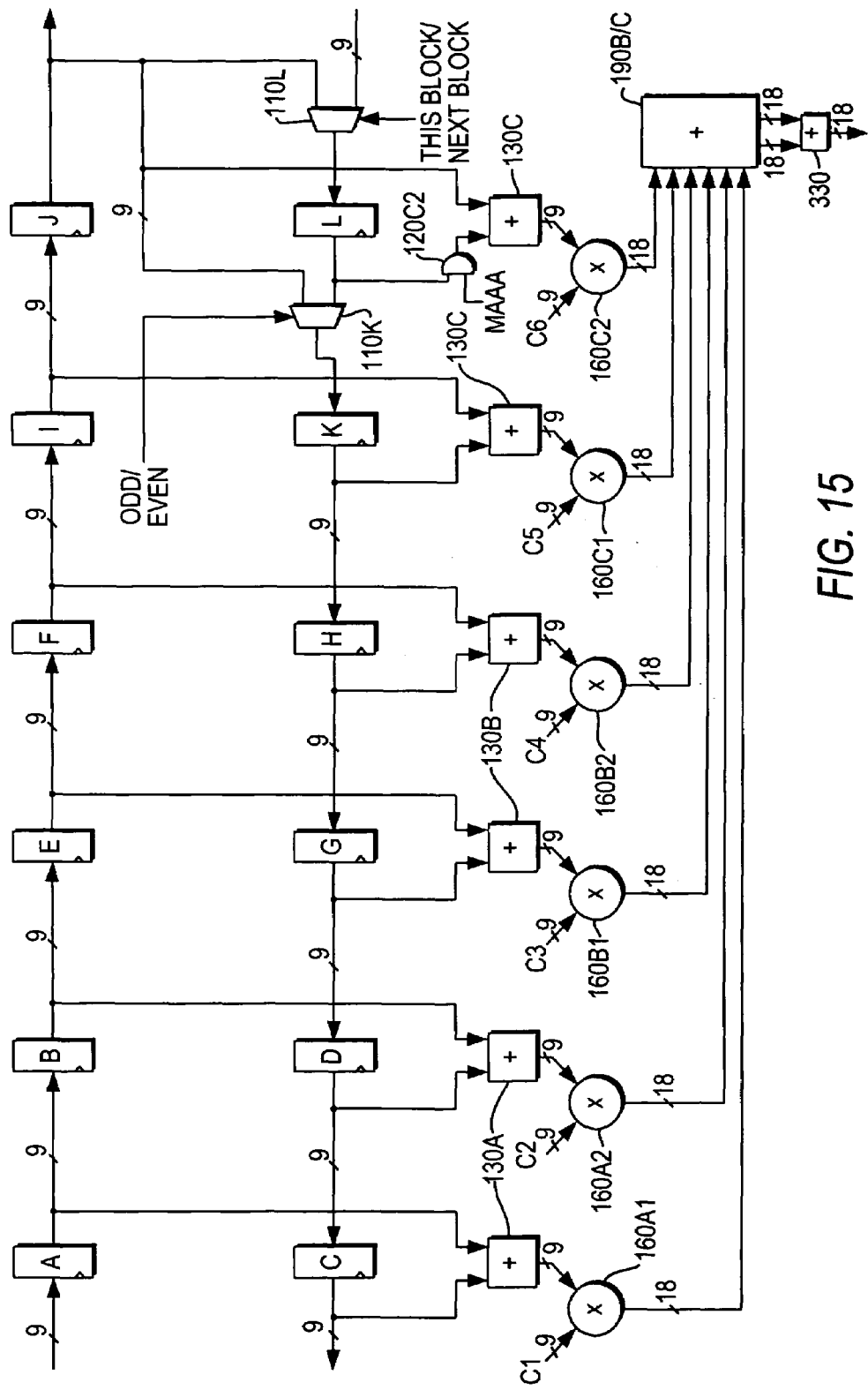
FIG. 15 shows yet another illustrative use or configuration of a DSP block in accordance with the invention.

FIG. 15 shows how the circuitry of DSP block 20 can be used for either an even-order or odd-order, symmetrical FIR filter operating on 9-bit samples. In the even-order case, multiplexers 110 (FIG. 6) are controlled to pass successive 9-bit samples successively through registers A, B, E, F, I, J, L, K, H, G, D, and C. In the odd-order case, multiplexers 110 are controlled to pass successive 9-bit samples successively through registers A, B, E, F, I, J, K, H, G, D, and C. Register L is bypassed. In either case, the left-hand portion of adder 130A is used to add the outputs of registers A and C, and multiplication subcircuit 160A1 is used to multiply the result of that addition by coefficient C1. Also in either case, the right-hand portion of adder 130A is used to add the outputs of registers B and D, and multiplication subcircuit 160A2 multiplies the result of that addition by coefficient C2. Still further in either case, part of adder 130B adds E and G, and circuit 160B1 multiplies the result by C3; the other part of adder 130B adds F and H, and circuit 160B2 multiplies the result by C4; and part of adder 130C adds I and K, and circuit 160C1 multiplies the result by C5. In the even-order case, mode control signal MAAA enables logic gates 120C2 so that the other part of adder 130C can add J and L, the result of which is multiplied by C6 in circuit 160C2. In the odd-order case, mode control signal MAAA disables logic gates 120C2 so that L is ignored and circuit 160C2 multiplies only J by C6. In both cases, the outputs of all of circuits

160A1, 160A2, 160B1, 160B2, 160C1, and 160C2 are added together by circuitry of DSP block 20 that is not shown again in detail in FIG. 15 but that is shown in detail in FIGS. 3-5 (see also FIG. 11). In particular, 160A1 and 160B1 outputs are added by part of 190B, 160A2 and 160B2 outputs are added by the other part of 190B, 190B (first part) and 160C1 outputs are added by part of 190C, 190B (second part) and 160C2 outputs are added by the other part of 190C, and the outputs of the two parts of 190C are added in adder 330, which is outside DSP block 20 in programmable logic circuitry 30.

It may be helpful to have in one place the following table of the values of mode control signals MA, MAA, and MAAA in various modes of operation of the circuitry:

1. Non-FIR mode:
   MA, MAA, MAAA all 0.
2. FIR mode, 18-bit, even-order:
   MA, MAA, MAAA all 1.
3. FIR mode, 18-bit, odd-order:
   MA=1, MAA=0, MAAA=0
4. FIR mode, 9-bit, even-order:
   MA, MAA, MAAA all 1.
5. FIR mode, 9-bit, odd-order:
   MA=1, MAA=1, MAAA=0.

The connections between DSP blocks 20 shown, for example, in FIGS. 1 and 6 is to facilitate the building of longer (i.e., more taps) FIR filters.

Figure 16:
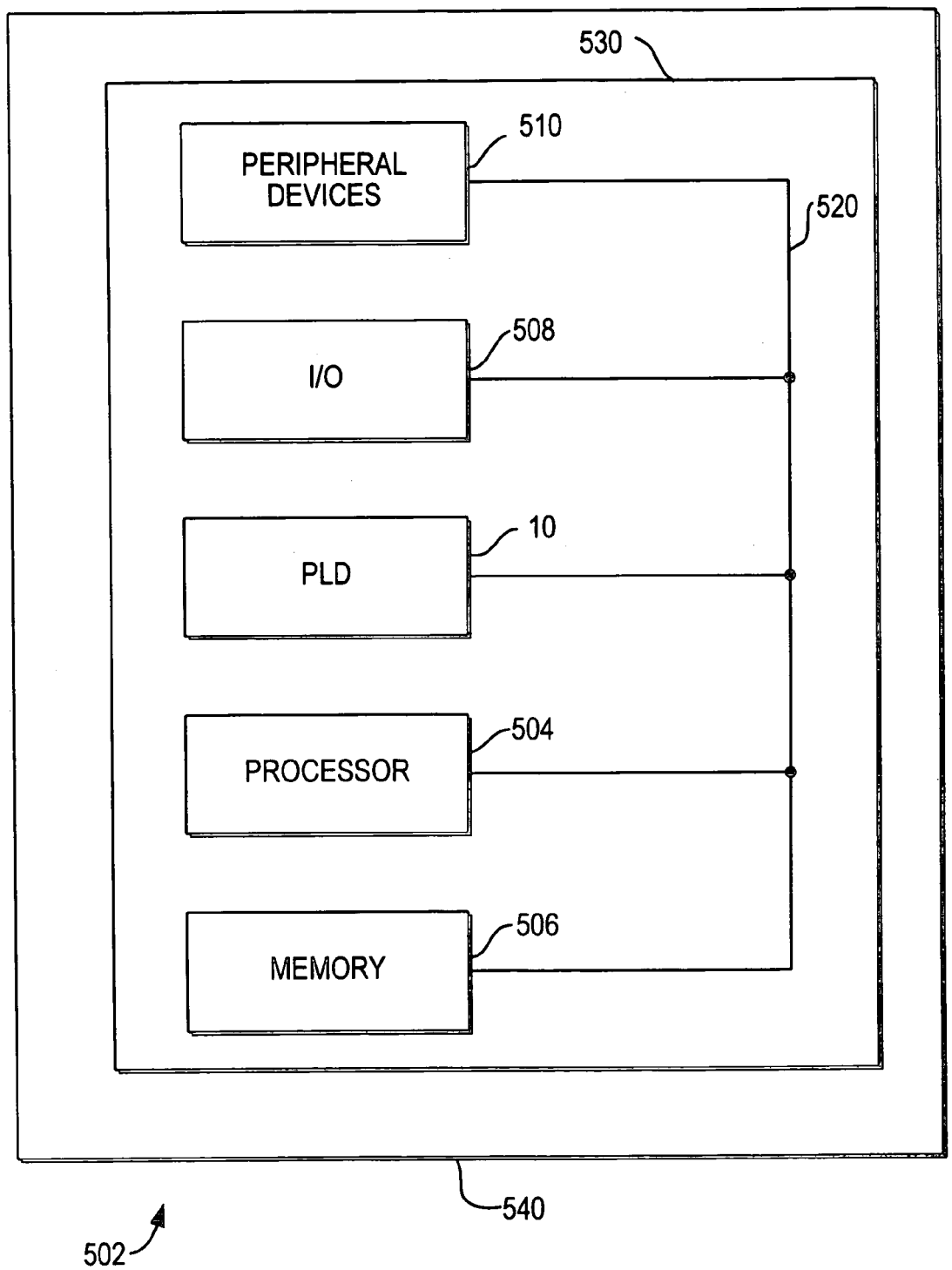
FIG. 16 is a simplified schematic block diagram of an illustrative system employing a programmable logic device in accordance with the invention.

FIG. 16 illustrates a programmable logic device 10 of this invention in a data processing system 502. Data processing system 502 may include one or more of the following components: a processor 504; memory 506; I/O circuitry 508; and peripheral devices 510. These components are coupled together by a system bus 520 and are populated on a circuit board 530 (e.g., a printed circuit board), which is contained in an end-user system 540.

System 502 can be used in any of a wide variety of applications, such as computer networking, data networking, instrumentation, video processing, digital signal processing, or any other application where the advantage of using programmable or reprogrammable logic is desirable. Programmable logic device 10 can be used to perform a variety of different logic functions. For example, programmable logic device 10 can be configured as a processor or controller that works in cooperation with processor 504. Programmable logic device 10 may also be used as an arbiter for arbitrating access to a shared resource in system 502. In yet another example, programmable logic device 10 can be configured as an interface between processor 504 and one of the other components in system 502. It should be noted that system 502 is only exemplary, and that the true scope and spirit of the invention should be indicated by the following claims.

Various technologies can be used to implement programmable logic devices 10 in accordance with this invention, as well as the various components of those devices (e.g., the logic connectors (such as the depicted multiplexers) used to make connections throughout PLD 10, and the elements that control those logic connectors (the logic connectors being sometimes called "PLCS" and the control elements being called "FCEs")). For example, each PLC can be a relatively simple programmable connector such as a switch or a plurality of switches for connecting any one of several inputs to an output. Alternatively, each PLC can be a somewhat more complex element that is capable of performing logic (e.g., by logically combining several of its inputs) as well as making a connection. In the latter case, for example, each PLC can be product term logic, implementing functions such as AND, NAND, OR, or NOR. Examples of components suitable for implementing PLCs are EPROMs, EEPROMs, pass transistors, transmission gates, antifuses, laser fuses, metal optional links, etc. As has been mentioned, the various components of PLCs can be controlled by various, programmable, function control elements ("FCEs"). (With certain PLC implementations (e.g., fuses and metal optional links) separate FCE devices are not required.) FCEs can also be implemented in any of several different ways. For example, FCEs can be SRAMs, DRAMs, first-in first-out ("FIFO") memories, EPROMs, EEPROMs, function control registers (e.g., as in Wahlstrom U.S. Pat. No. 3,473,160), ferro-electric memories, fuses, antifuses, or the like. From the various examples mentioned above it will be seen that this invention is applicable to both one-time-only programmable and reprogrammable devices.

It will be understood that the foregoing is only illustrative of the principles of the invention, and that various modifications can be made by those skilled in the art without departing from the scope and spirit of the invention. For example, any number of DSP blocks 20 can be included in PLD 10. As another example, the various bus widths shown and described herein (e.g., 9, 18, 27, 36) are only illustrative, and any other suitable bus widths (e.g., 8, 16, 24, 32) can be used instead if desired. The same is true for the widths of the various arithmetic elements employed (e.g., the widths of the multipliers, adders, etc.). The particular operating modes shown and described herein are only illustrative, and many other operating modes are also possible.

What is claimed is:

1. Multi-functional digital signal processing circuitry comprising:
   first, second, and third multiplier circuitries;
   first, second, and third input adder circuitries for selectively producing sums of inputs for use by the multiplier circuitries, wherein at least one of the input adder circuitries comprises input selection circuitry for controllably selecting from at least some of the inputs; and
   first, second, and third output adder circuitries for selectively combining outputs of the multiplier circuitries, wherein at least one of the multiplier circuitries is controllable to either separately perform plural relatively short multiplications or one relatively long multiplication.

2. The circuitry defined in claim 1 further comprising:
   a plurality of registers for storing at least some of the inputs.

3. The circuitry defined in claim 2 further comprising:
   interconnection circuitry for allowing contents of selected ones of the registers to be selectively shifted to selected others of the registers.

4. The circuitry defined in claim 1, wherein the input selection circuitry comprises circuitry for selectively nulling an input to the at least one input adder circuitries.

5. The circuitry defined in claim 1 further comprising:
   selection circuitry for deriving an input to at least one of the multiplier circuitries from a source other than one of the input adder circuitries.

6. The circuitry defined in claim 1 wherein at least one of the output adder circuitries is configured to subtract.

7. The circuitry defined in claim 1 wherein at least one of the output adder circuitries is controllable to add or subtract.

8. The circuitry defined in claim 1 wherein the first and second output adder circuitries are connected to selectively combine outputs of the first and second multiplier circuitry.

9. A programmable logic device including circuitry as defined in claim 1.

10. The programmable logic device defined in claim 9 further comprising:
routing circuitry for selectively supplying signals to and receiving signals from the multi-functional digital signal processing circuitry.

11. The programmable logic device defined in claim 10 further comprising:
programmable logic circuitry connected to the routing circuitry.

12. A digital processing system comprising:
processing circuitry;
a memory coupled to the processing circuitry; and
a programmable logic device as defined in claim 9 coupled to the processing circuitry and the memory.

13. A printed circuit board on which is mounted a programmable logic device as defined in claim 9.

14. The printed circuit board defined in claim 13 further comprising:
a memory mounted on the printed circuit board and coupled to the programmable logic device.

15. The printed circuit board defined in claim 13 further comprising:
processing circuitry mounted on the printed circuit board and coupled to the programmable logic device.

16. Multi-functional digital signal processing circuitry comprising:
first, second, and third multiplier circuitries;
first, second, and third input adder circuitries for selectively producing sums of inputs for use by the multiplier circuitries, wherein at least one of the input adder circuitries comprises input selection circuitry for controllably selecting from at least some of the inputs; and
first, second, and third output adder circuitries for selectively combining outputs of the multiplier circuitries, wherein at least one of the input adder circuitries is controllable to either separately add plural pairs of relatively short inputs or one pair of relatively long inputs.

17. Multi-functional digital signal processing circuitry comprising:
first, second, and third multiplier circuitries;
first, second, and third input adder circuitries for selectively producing sums of inputs for use by the multiplier circuitries, wherein at least one of the input adder circuitries comprises input selection circuitry for controllably selecting from at least some of the inputs; and
first, second, and third output adder circuitries for selectively combining outputs of the multiplier circuitries, wherein at least one of the output adder circuitries is controllable to either separately add plural pairs of relatively short inputs or one pair of relatively long inputs.

18. Multi-functional digital signal processing circuitry comprising:
first, second, and third multiplier circuitries;
first, second, and third input adder circuitries for selectively producing sums of inputs for use by the multiplier circuitries, wherein at least one of the input adder circuitries comprises input selection circuitry for controllably selecting from at least some of the inputs;
first, second, and third output adder circuitries for selectively combining outputs of the multiplier circuitries;
a plurality of registers for storing at least some of the inputs; and
interconnection circuitry for allowing successive data samples to be shifted through the registers so that each sample is present in the register for as long as it is needed as an input to a finite impulse response filter function.

19. The circuitry defined in claim 18 further comprising:
connections for applying the contents of a pair of registers to at least one of the input adder circuitries, the registers in the pair containing two samples to which a common multiplier is applied in the finite impulse response filter function.

20. The circuitry defined in claim 18 wherein the interconnection circuitry is controllable to selectively skip at least one of the registers through which the samples are shifted depending on whether the finite impulse response filter function is of odd or even order.

21. Multi-functional digital signal processing circuitry comprising:
first, second, and third multiplier circuitries;
first, second, and third input adder circuitries for selectively producing sums of inputs for use by the multiplier circuitries, wherein at least one of the input adder circuitries comprises input selection circuitry for controllably selecting from at least some of the inputs; and
first, second, and third output adder circuitries for selectively combining outputs of the multiplier circuitries, wherein the inputs comprise real and imaginary parts of two complex numbers to be multiplied, and wherein the circuitry further comprises:
input connections for applying the real parts to the first multiplier circuitry, for applying the imaginary parts to the second multiplier circuitry, and for applying the real and imaginary parts to the third input adder circuitry to produce sums for use by the third multiplier circuitry.

22. Multi-functional digital signal processing circuitry comprising:
first, second, and third multiplier circuitries;
first, second, and third input adder circuitries for selectively producing sums of inputs for use by the multiplier circuitries, wherein at least one of the input adder circuitries comprises input selection circuitry for controllably selecting from at least some of the inputs; and
first, second, and third output adder circuitries for selectively combining outputs of the multiplier circuitries, wherein the first and second output adder circuitries are connected to selectively combine outputs of the first and second multiplier circuitry, and wherein the third output adder circuitry is connected to selectively combine outputs of the second output adder circuitry and the third multiplier circuitry.

23. DSP circuitry comprising:
a plurality of registers;
circuitry for selectively shifting data among the registers;
a plurality of input adder circuits for selectively operating on signals from the registers, wherein at least one of the plurality of input adder circuits comprises input selection circuitry for controllably selecting from at least some of the signals from the registers;
a plurality of multiplier circuits for selectively operating on selected signals from the input adder circuits; and
a plurality of output adder circuits for selectively operating on selected signals from the multiplier circuits, wherein at least one of the multiplier circuits is selectively able to operate either as two, separate, relatively small multiplier circuits or as one relatively large multiplier circuit.

24. The circuitry defined in claim 23 further comprising:
circuitry for alternatively selecting some of the signals for at least one of the multiplier circuits to operate on from a source other than the input registers.

25. The circuitry defined in claim 23 wherein at least one of the output adder circuits is selectively able to subtract.

26. The circuitry defined in claim 23 wherein the plurality of multiplier circuits consists of three multiplier circuits.

27. DSP circuitry comprising:
a plurality of registers;
circuitry for selectively shifting data among the registers;
a plurality of input adder circuits for selectively operating on signals from the registers, wherein at least one of the plurality of input adder circuits comprises input selection circuitry for controllably selecting from at least some of the signals from the registers;
a plurality of multiplier circuits for selectively operating on selected signals from the input adder circuits; and
a plurality of output adder circuits for selectively operating on selected signals from the multiplier circuits, wherein at least one of the input adder circuits is selectively able to operate either as two, separate, relatively small adder circuits or as one relatively large adder circuit.

28. DSP circuitry comprising:
a plurality of registers;
circuitry for selectively shifting data among the registers;
a plurality of input adder circuits for selectively operating on signals from the registers, wherein at least one of the plurality of input adder circuits comprises input selection circuitry for controllably selecting from at least some of the signals from the registers;
a plurality of multiplier circuits for selectively operating on selected signals from the input adder circuits; and
a plurality of output adder circuits for selectively operating on selected signals from the multiplier circuits, wherein at least one of the output adder circuits is selectively able to operate either as two, separate, relatively small adder circuits or as one relatively large adder circuit.

29. DSP circuitry comprising:
a plurality of registers;
a plurality of multiplier circuits;
at least one input adder circuit associated with each of the multiplier circuits for selectively adding outputs of the registers to provide a first set of inputs to the associated multiplier circuit, wherein the at least one input adder circuit comprises register selection circuitry for controllably selecting among at least some of the outputs of the registers;
at least one input selection circuit associated with each of the multiplier circuits for selecting from (a) outputs of selected ones of the registers and (b) signals external to the DSP circuitry to provide a second set of inputs to the multiplier circuit associated with that input selection circuit; and
an output adder circuit associated with each of the multiplier circuits, each of the output adder circuits being connected to add outputs of the associated multiplier circuit and outputs of another circuit selected from the group consisting of another multiplier circuit and another output adder circuit.

30. The DSP circuitry defined in claim 29 further comprising:
register input selection circuitry associated with each of the registers for selecting from (a) outputs of another one of the registers and (b) signals external to the DSP circuitry to provide inputs to the associated register.

31. DSP circuitry comprising:
a plurality of registers;
a plurality of multiplier circuits;
at least one input adder circuit associated with each of the multiplier circuits for selectively adding outputs of the registers to provide a first set of inputs to the associated multiplier circuit, wherein the at least one input adder circuit comprises register selection circuitry for controllably selecting among at least some of the outputs of the registers; and
at least one input selection circuit associated with each of the multiplier circuits for selecting from (a) outputs of selected ones of the registers and (b) signals external to the DSP circuitry to provide a second set of inputs to the multiplier circuit associated with that input selection circuit, wherein at least one of the multiplier circuits has associated additional input adder circuitry and associated additional input selection circuitry, the additional input adder circuitry adding outputs of selected one of the registers different than the register outputs addable by the input adder circuit associated with that multiplier circuit, and the additional input selection circuitry being operable to selectively provide the first set of inputs to that multiplier circuit from the additional input adder circuitry.

32. The DSP circuitry defined in claim 31 wherein the at least one of the multiplier circuits has associated further input adder circuitry for adding outputs of selected ones of the registers different than the register outputs addable by the input adder circuit and the additional input adder circuitry associated with that multiplier circuit, and wherein the input selection circuit associated with that multiplier is additionally able to select outputs of the further input adder circuitry as the second set of inputs to that multiplier circuit.

33. DSP circuitry comprising:
a plurality of registers;
a plurality of multiplier circuits;
at least one input adder circuit associated with each of the multiplier circuits for selectively adding outputs of the registers to provide a first set of inputs to the associated multiplier circuit, wherein the at least one input adder circuit comprises register selection circuitry for controllably selecting among at least some of the outputs of the registers; and
at least one input selection circuit associated with each of the multiplier circuits for selecting from (a) outputs of selected ones of the registers and (b) signals external to the DSP circuitry to provide a second set of inputs to the multiplier circuit associated with that input selection circuit, wherein each of the multiplier circuits separately multiplies (a) first portions of the first and second sets of inputs to that multiplier circuit and (b) second portions of the first and second sets of inputs to that multiplier circuit to produce first and second products.

34. The DSP circuitry defined in claim 33 wherein each of the multiplier circuits can separately output the first and second products.

35. The DSP circuitry defined in claim 34 wherein each of the multiplier circuits can alternatively combine the first and second products as partial products to produce a third product.

* * * * *